(12) United States Patent
Kovacic

(10) Patent No.: US 12,166,548 B2
(45) Date of Patent: *Dec. 10, 2024

(54) BEAMFORMING COMMUNICATION SYSTEM WITH CROSSBAR SWITCH

(71) Applicant: Skyworks Solutions, Inc., Irvine, CA (US)

(72) Inventor: Stephen Joseph Kovacic, Newport Beach, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/646,043

(22) Filed: Dec. 27, 2021

(65) Prior Publication Data

US 2022/0209834 A1 Jun. 30, 2022

Related U.S. Application Data

(60) Provisional application No. 63/202,919, filed on Jun. 30, 2021, provisional application No. 63/199,444, filed on Dec. 29, 2020.

(51) Int. Cl.
*H04B 7/06* (2006.01)
*H01Q 21/06* (2006.01)
(Continued)

(52) U.S. Cl.
CPC ......... *H04B 7/0604* (2013.01); *H01Q 21/065* (2013.01); *H04B 1/04* (2013.01);
(Continued)

(58) Field of Classification Search
CPC .. H04B 7/0604; H04B 7/0469; H04B 7/0617; H04B 7/0686
(Continued)

(56) References Cited

U.S. PATENT DOCUMENTS 5,548,813 A 8/1996 Charas et al.
8,942,653 B2 1/2015 Ahn et al.
(Continued)

FOREIGN PATENT DOCUMENTS

CN 107069208 8/2017
CN 206774674 U 12/2017
JP 2011233962 * 11/2011

OTHER PUBLICATIONS

Kim et al., "Tens of Gbps Support with mmWave Beamforming Systems for Next Generation Communications" IEEE, Globecom 2013—Wireless Communications Symposium, 6 pages.
(Continued)

*Primary Examiner* — Leila Malek
(74) *Attorney, Agent, or Firm* — Knobbe, Martens, Olson & Bear, LLP

(57) ABSTRACT

Beamforming communication systems with crossbar switches are provided herein. In certain embodiments, a beamforming communication system includes an antenna array partitioned into a plurality of sub-arrays, a plurality of front-end channels each operatively associated with one of the sub-arrays, a plurality of data conversion channels, and a crossbar switch electrically connected between the data conversion channels and the front-end channels. Including the crossbar switch allows for a flexible allocation of the data conversion channels to the front-end channels and subsequently to each individual antenna element in the array.

20 Claims, 16 Drawing Sheets

(51) Int. Cl.
 *H04B 1/04* (2006.01)
 *H04B 7/0456* (2017.01)
(52) U.S. Cl.
 CPC ......... *H04B 7/0469* (2013.01); *H04B 7/0617* (2013.01); *H04B 7/0686* (2013.01); *H04B 2001/0416* (2013.01)
(58) Field of Classification Search
 USPC ....................................................... 375/272
 See application file for complete search history.

(56) References Cited

U.S. PATENT DOCUMENTS

| | | | |
|---|---|---|---|
| 9,485,552 B1* | 11/2016 | Dupuis | H04Q 11/0001 |
| 9,794,091 B1* | 10/2017 | Yucek | H04L 27/0002 |
| 10,727,923 B2 | 7/2020 | Thyagarajan et al. | |
| 2002/0136170 A1* | 9/2002 | Struhsaker | H04L 1/0042 370/347 |
| 2003/0228857 A1 | 12/2003 | Maeki | |
| 2004/0198452 A1* | 10/2004 | Roy | H04B 7/0874 455/562.1 |
| 2007/0071118 A1* | 3/2007 | Sydir | H04K 1/00 375/260 |
| 2007/0263748 A1 | 11/2007 | Mesecher | |
| 2008/0268775 A1 | 10/2008 | Bishop | |
| 2008/0268790 A1 | 10/2008 | Shi et al. | |
| 2013/0241800 A1 | 9/2013 | Schlub et al. | |
| 2017/0302348 A1 | 10/2017 | Reinhardt | |
| 2017/0331670 A1 | 11/2017 | Parkvall et al. | |
| 2018/0198204 A1 | 7/2018 | Kovacic | |
| 2020/0091608 A1 | 3/2020 | Alpman et al. | |
| 2020/0119454 A1 | 4/2020 | Asrani | |
| 2021/0273345 A1 | 9/2021 | Moon et al. | |
| 2022/0182105 A1 | 6/2022 | Ota et al. | |
| 2022/0209836 A1 | 6/2022 | Kovacic | |
| 2022/0360303 A1* | 11/2022 | Rainish | H04B 7/0848 |
| 2023/0208451 A1 | 6/2023 | Kovacic et al. | |

OTHER PUBLICATIONS

Kim et al., "Multi-beam transmission diversity with hybrid beamforming for MIMO-OFDM systems", Globecom 2013 Workshop—Emerging Technologies for LTE-Advanced and Beyond-4G, pp. 61-65.

Karjalainen, Juha, "On Multi-Antenna Transceivers for mm-wave 5G," Samsung Electronics, 5G New Air Interfaces, IEEE Globecom Industry Workshop 2014, Austin, USA, 10 pages.

Karjalainen et al., "Challenges and opportunities of mm-wave communications in 5G networks", Crowncom, Jun. 2-4, 2014, Oulu, Finland, in 5 pages.

Peng et al. "High performance 5G millimeter-wave antenna array for 37-40 GHz mobile application" Conference Paper Mar. 2018, Research Gate IEEE in 5 pages.

Rajagopal et al., "Power Efficient Signal Processing for mmWave 5G Systems" J Sign Process Syst 2016, Published online: Nov. 18, 2015, 14 pages.

* cited by examiner

BEAMFORMING COMMUNICATION SYSTEM WITH CROSSBAR SWITCH

CROSS-REFERENCE TO RELATED APPLICATIONS

This application claims the benefit of priority under 35 U.S.C. § 119 of U.S. Provisional Patent Application No. 63/202,919, filed Jun. 30, 2021 and titled "BEAMFORMING COMMUNICATION SYSTEM WITH FLEXIBILITY AND MODULARITY," and of U.S. Provisional Patent Application No. 63/199,444, filed Dec. 29, 2020 and titled "BEAMFORMING COMMUNICATION SYSTEM WITH CROSSBAR SWITCH," each of which is herein incorporated by reference in its entirety.

BACKGROUND

Technical Field

Embodiments of the invention relate to electronic systems, and in particular, to radio frequency (RF) electronics.

Description of Related Technology

Radio frequency (RF) communication systems can be used for transmitting and/or receiving signals of a wide range of frequencies. For example, an RF communication system can be used to wirelessly communicate RF signals in a frequency range of about 30 kHz to 300 GHz, such as in the range of about 410 MHz to about 7.125 GHz for fifth generation (5G) communications using Frequency Range 1 (FR1) or in the range of about 24.25 GHz to 52.6 GHz for 5G communications using Frequency Range 2 (FR2).

Examples of RF communication systems include, but are not limited to, mobile phones, tablets, base stations, network access points, customer-premises equipment (CPE), laptops, and wearable electronics.

SUMMARY

In certain embodiments, the present disclosure relates to a beamforming communication system including an antenna array partitioned into a plurality of sub-arrays, and a plurality of front-end modules each operatively associated with a corresponding one of the plurality of sub-arrays. Each of the plurality of front-end modules includes at least two radio frequency transmit channels configured to process at least two radio frequency transmit signals, and a frequency conversion circuit configured to upconvert a common transmit signal to generate the at least two radio frequency transmit signals.

In various embodiments, each of the at least two radio frequency transmit channels provides a separately controllable gain adjustment.

In some embodiments, each of the at least two radio frequency transmit channels provides a separately controllable phase adjustment.

In several embodiments, each of the least two radio frequency transmit signals is configured to process a horizontally-polarized radio frequency transmit signal and a vertically-polarized radio frequency transmit signal.

In a number of embodiments, the common transmit signal is at intermediate frequency.

In some embodiments, the common transmit signal is at baseband.

In various embodiments, the frequency conversion circuit of at least one of the plurality of front-end modules generates a local oscillator signal used by at least one other of the plurality of front-end modules. According to a number of embodiments, the frequency conversion circuit of the at least one other of the plurality of front-end modules is disabled when using the local oscillator signal.

In several embodiments, each of the plurality of front-end modules further includes at least two radio frequency receive channels, and the frequency conversion circuit is further configured to combine two or more radio frequency receive signals outputted from the at least two radio frequency receive channels to generate a combined radio frequency receive signal, and to downconvert the combined radio frequency receive signal to generate a common receive signal.

In some embodiments, the beamforming communication system further includes a plurality of data conversion channels and a crossbar switch electrically connected between the plurality of data conversion channels and the plurality of front-end modules.

In various embodiments, each of the plurality of sub-arrays is integrated with a corresponding one of the plurality of front-end modules. According to a number of embodiments, each of the plurality of sub-arrays comprises a mosaic of patch antenna elements.

In several embodiments, the beamforming communication system further includes a digital interface over which the plurality of front-end modules communicate.

In some embodiments, the plurality of front-end modules are interconnected to process the common transmit signal. According to a number of embodiments, the plurality of front-end modules are connected in a daisy chain to process the common transmit signal. In accordance with various embodiments, at least one of the plurality of front-end modules is configured to condition the common transmit signal with at least one of an amplitude adjustment or a phase adjustment.

In certain embodiments, the present disclosure relates to a modular front-end for servicing a sub-array of an antenna array. The front-end module includes a frequency conversion circuit configured to upconvert a common transmit signal to generate at least two radio frequency transmit signals, and at least two radio frequency transmit channels configured to process the at least two radio frequency transmit signals.

In various embodiments, each of the at least two radio frequency transmit channels provides a separately controllable gain adjustment.

In several embodiments, each of the at least two radio frequency transmit channels provides a separately controllable phase adjustment.

In some embodiments, each of the least two radio frequency transmit signals is configured to process a horizontally-polarized radio frequency transmit signal and a vertically-polarized radio frequency transmit signal.

In a number of embodiments, the common transmit signal is at intermediate frequency.

In several embodiments, the common transmit signal is at baseband.

In some embodiments, the frequency conversion circuit is operable in a plurality of modes including a first mode in which mixing is provided based on a received local oscillator signal, and a second mode in which the frequency conversion circuit generates a local oscillator signal for mixing.

In various embodiments, the modular front-end further includes at least two radio frequency receive channels, the frequency conversion circuit further configured to combine two or more radio frequency receive signals outputted from the at least two radio frequency receive channels to generate a combined radio frequency receive signal, and to downconvert the combined radio frequency receive signal to generate a common receive signal.

In several embodiments, the modular front-end further includes at least two antenna elements configured to transmit the at least two radio frequency transmit signals after processing by the at least two radio frequency transmit channels. According to a number of embodiments, the at least two antenna elements corresponds to a mosaic of patch antenna elements.

In various embodiments, the modular front-end further includes a digital interface configured to communicate with one or more other modular front-ends.

In some embodiments, the modular front-end further includes a signal conditioning circuit to provide at least of a gain adjustment or a phase adjustment to the common transmit signal.

In certain embodiments, the present disclosure relates to a method of beamforming. The method includes upconverting a common transmit signal to generate at least two radio frequency transmit signals using a frequency conversion circuit of a modular front-end, processing the at least two radio frequency transmit signals using at least two radio frequency transmit signals of the modular front-end, and transmitting the at least two radio frequency transmit signals after processing on a sub-array of an antenna array.

In certain embodiments, the present disclosure relates to a beamforming communication system including an antenna array partitioned into a plurality of sub-arrays, a plurality of front-end channels each operatively associated with one of the sub-arrays, a plurality of data conversion channels, and a crossbar switch electrically connected between the plurality of data conversion channels and the plurality of front-end channels.

In various embodiments, the crossbar switch is configured to connect one of the plurality of front-end channels to two or more of the plurality of data conversion channels.

In several embodiments, the crossbar switch is configured to connect two or more of the plurality of front-end channels to one of the plurality of data conversion channels.

In some embodiments, a number of the plurality of front-end channels is equal to a number of the plurality of data conversion channels.

In various embodiments, a number of the plurality of front-end channels is unequal to a number of the plurality of data conversion channels. According to a number of embodiments, the number of the plurality of data conversion channels is greater than the plurality of front-end channels. In accordance with some several embodiments, the plurality of data conversion channels includes at least one redundant data conversion channel.

In some embodiments, each of the plurality of sub-arrays includes two or more antennas.

In various embodiments, each of the plurality of data conversion channels includes at least one digital-to-analog converter for generating an analog transmit signal, and at least one analog-to-digital converter for processing an analog receive signal.

In several embodiments, each of the plurality of data conversion channels includes at least one upconverting mixer for upconverting an analog transmit signal and at least one downconverting mixer for downconverting a radio frequency receive signal.

In some embodiments, the beamforming communication system further includes a plurality of mixers positioned between the crossbar switch and the plurality of front-end channels.

In a number of embodiments, each of the plurality of radio frequency channels includes a radio frequency splitter coupled to a plurality of radio frequency signal conditioning circuits.

In some embodiments, each of the plurality of radio frequency channels includes a radio frequency combiner coupled to a plurality of radio frequency signal conditioning circuits.

In various embodiments, each of the plurality of radio frequency channels includes a radio frequency splitter/combiner coupled to a plurality of radio frequency signal conditioning circuits.

According to a number embodiments, each of the sub-arrays includes a plurality of antennas, and each of the plurality of radio frequency signal conditioning circuits is coupled to one of the plurality of antennas.

In several embodiments, the crossbar switch includes a plurality of controllable gain elements configured to control a gate at each output of the crossbar switch.

In various embodiments, the crossbar switch is configured to connect two or more of the plurality of data conversion channels to a common radio frequency channel of the plurality of radio frequency channels. According to a number of embodiments, the two or more of the plurality of data conversion channels includes a first data conversion channel configured to process a first data stream associated with a first signal polarization, and a second data conversion channel configured to process a second data stream associated with a second signal polarization. In accordance with several embodiments, the two or more of the plurality of data conversion channels includes a first data conversion channel configured to process a first data stream associated with a first carrier frequency, and a second data conversion channel configured to process a second data stream associated with a second carrier frequency.

In various embodiments, the beamforming communication system further includes a baseband processor coupled to the plurality of data conversion channels.

In certain embodiments, the present disclosure relates to a base station. The base station includes an antenna array partitioned into a plurality of sub-arrays, a front-end system including a plurality of front-end channels each operatively associated with one of the sub-arrays, and a transceiver comprising a plurality of data conversion channels and a crossbar switch electrically connected between the plurality of data conversion channels and the plurality of front-end channels.

In various embodiments, the crossbar switch is configured to connect one of the plurality of front-end channels to two or more of the plurality of data conversion channels.

In several embodiments, the crossbar switch is configured to connect two or more of the plurality of front-end channels to one of the plurality of data conversion channels.

In some embodiments, a number of the plurality of front-end channels is equal to a number of the plurality of data conversion channels.

In various embodiments, a number of the plurality of front-end channels is unequal to a number of the plurality of data conversion channels. According to several embodiments, the number of the plurality of data conversion channels is greater than the plurality of front-end channels. In accordance with a number of embodiments, the plurality of data conversion channels includes at least one redundant data conversion channel.

In some embodiments, each of the plurality of sub-arrays includes two or more antennas.

In several embodiments, each of the plurality of data conversion channels includes at least one digital-to-analog converter for generating an analog transmit signal, and at least one analog-to-digital converter for processing an analog receive signal.

In various embodiments, each of the plurality of data conversion channels includes at least one upconverting mixer for upconverting an analog transmit signal and at least one downconverting mixer for downconverting a radio frequency receive signal.

In some embodiments, the base station further includes a plurality of mixers positioned between the crossbar switch and the plurality of front-end channels.

In several embodiments, each of the plurality of radio frequency channels includes a radio frequency splitter coupled to a plurality of radio frequency signal conditioning circuits.

In various embodiments, each of the plurality of radio frequency channels includes a radio frequency combiner coupled to a plurality of radio frequency signal conditioning circuits.

In some embodiments, each of the plurality of radio frequency channels includes a radio frequency splitter/combiner coupled to a plurality of radio frequency signal conditioning circuits.

In several embodiments, each of the sub-arrays includes a plurality of antennas, and each of the plurality of radio frequency signal conditioning circuits is coupled to one of the plurality of antennas.

In various embodiments, the crossbar switch includes a plurality of controllable gain elements configured to control a gate at each output of the crossbar switch.

In some embodiments, the crossbar switch is configured to connect two or more of the plurality of data conversion channels to a common radio frequency channel of the plurality of radio frequency channels. According to a number of embodiments, the two or more of the plurality of data conversion channels includes a first data conversion channel configured to process a first data stream associated with a first signal polarization, and a second data conversion channel configured to process a second data stream associated with a second signal polarization. In accordance with various embodiments, the two or more of the plurality of data conversion channels includes a first data conversion channel configured to process a first data stream associated with a first carrier frequency, and a second data conversion channel configured to process a second data stream associated with a second carrier frequency.

In several embodiments, a baseband processor coupled to the plurality of data conversion channels.

In certain embodiments, the present disclosure relates to a mobile device. The mobile device includes an antenna array partitioned into a plurality of sub-arrays, a front-end system including a plurality of front-end channels each operatively associated with one of the sub-arrays, and a transceiver comprising a plurality of data conversion channels and a crossbar switch electrically connected between the plurality of data conversion channels and the plurality of front-end channels.

In certain embodiments, the present disclosure relates to a method of beamforming. The method includes processing a plurality of radio frequency signals using a plurality of front-end channels coupled to an antenna array, the antenna array partitioned into a plurality of sub-arrays each operative associated with one of the plurality of front-end channels, coupling the plurality of front-end channels to a plurality of data conversion channels using a cross-bar switch, and beamforming a radio wave using the plurality of data conversion channels and the plurality of front-end channels.

In various embodiments, a number of the plurality of front-end channels is equal to a number of the plurality of data conversion channels. According to several embodiments, a number of the plurality of front-end channels is unequal to a number of the plurality of data conversion channels. In accordance with some embodiments, the number of the plurality of data conversion channels is greater than the plurality of front-end channels. According to a number of embodiments, the plurality of data conversion channels includes at least one redundant data conversion channel.

In some embodiments, each of the plurality of sub-arrays includes two or more antennas.

In several embodiments, the method further includes providing digital-to-analog conversion in each of the plurality of data conversion channels.

In a number of embodiments, the method further includes providing analog-to-digital conversion in each of the plurality of data conversion channels.

In various embodiments, the method further includes providing frequency upconversion in each of the plurality of data conversion channels.

In several embodiments, the method further includes providing frequency downconversion in each of the plurality of data conversion channels.

In a number of embodiments, the method further includes providing radio frequency combining in each of the radio frequency channels.

In various embodiments, the method further includes providing radio frequency splitting in each of the radio frequency channels. According to a number of embodiments, the method further includes using the crossbar switch to connect two or more of the plurality of data conversion channels to a common radio frequency channel of the plurality of radio frequency channels. In accordance with several embodiments, the method further includes using the two or more of the plurality of data conversion channels to process a first data stream associated with a first signal polarization and a second data stream associated with a second signal polarization.

In several embodiments, the method further includes using the two or more of the plurality of data conversion channels to process a first data stream associated with a first carrier frequency and a second data stream associated with a second carrier frequency.

BRIEF DESCRIPTION OF THE DRAWINGS

Embodiments of this disclosure will now be described, by way of non-limiting example, with reference to the accompanying drawings.

DETAILED DESCRIPTION OF CERTAIN EMBODIMENTS

Figure 1:
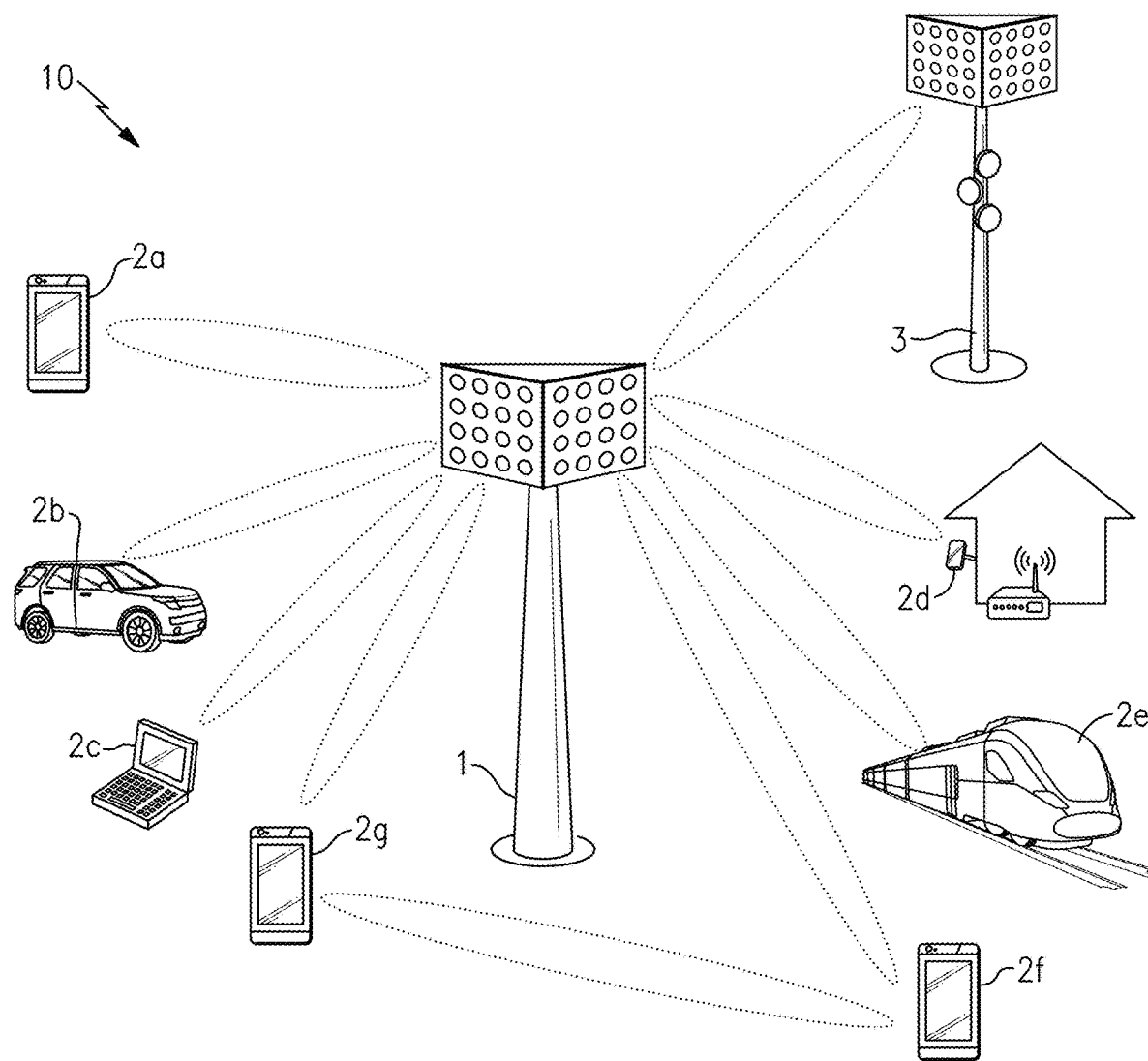
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IOT), Vehicle-to-Everything (V2X), and High Power User Equipment (HPUE).

3GPP introduced Phase 1 of fifth generation (5G) technology in Release 15, and introduced Phase 2 of 5G technology in Release 16. Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, a second mobile device 2f, and a third mobile device 2g.

Although specific examples of base stations and user equipment are illustrated in FIG. 1, a communication network can include base stations and user equipment of a wide variety of types and/or numbers. Moreover, a communication network can include satellite systems in various orbits connecting to ground terminals.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1 supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1, the communication links include not only communication links between UE and base stations, but also UE to UE communications and base station to base station communications. For example, the communication network 10 can be implemented to support self-fronthaul and/or self-backhaul (for instance, as between mobile device 2g and mobile device 2f).

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1), Frequency Range 2 (FR2), or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, a base station or user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz. For example, certain RF communication systems communicate using beamforming of 5G signals in the FR2 frequency range of 24.25 GHz to 52.6 GHz.

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

Figure 2A:
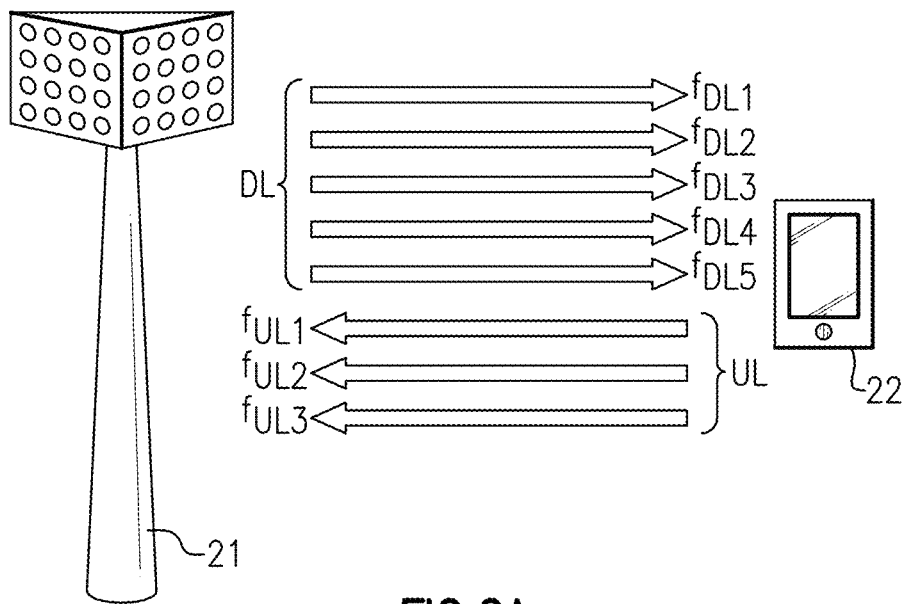
FIG. 2A is a schematic diagram of one example of a communication link using carrier aggregation.

FIG. 2A is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 21 and a mobile device 22. As shown in FIG. 2A, the communications link includes a downlink channel used for RF communications from the base station 21 to the mobile device 22, and an uplink channel used for RF communications from the mobile device 22 to the base station 21.

Although FIG. 2A illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 2A, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

Figure 2B:
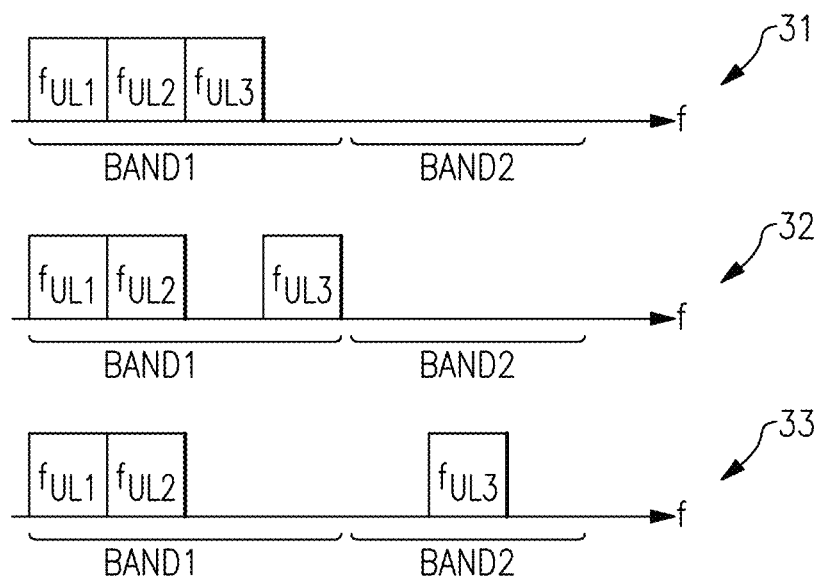
FIG. 2B illustrates various examples of uplink carrier aggregation for the communication link of FIG. 2A.

FIG. 2B illustrates various examples of uplink carrier aggregation for the communication link of FIG. 2A. FIG. 2B includes a first carrier aggregation scenario 31, a second carrier aggregation scenario 32, and a third carrier aggregation scenario 33, which schematically depict three types of carrier aggregation.

The carrier aggregation scenarios 31-33 illustrate different spectrum allocations for a first component carrier full, a second component carrier $f_{UL2}$, and a third component carrier $f_{UL3}$. Although FIG. 2B is illustrated in the context of aggregating three component carriers, carrier aggregation can be used to aggregate more or fewer carriers. Moreover, although illustrated in the context of uplink, the aggregation scenarios are also applicable to downlink.

The first carrier aggregation scenario 31 illustrates intra-band contiguous carrier aggregation, in which component carriers that are adjacent in frequency and in a common frequency band are aggregated. For example, the first carrier aggregation scenario 31 depicts aggregation of component carriers $f_{UL1}$, $f_{UL2}$, and $f_{UL3}$ that are contiguous and located within a first frequency band BAND1.

With continuing reference to FIG. 2B, the second carrier aggregation scenario 32 illustrates intra-band non-continuous carrier aggregation, in which two or more components carriers that are non-adjacent in frequency and within a common frequency band are aggregated. For example, the second carrier aggregation scenario 32 depicts aggregation of component carriers $f_{UL1}$, $f_{UL2}$, and $f_{UL3}$ that are non-contiguous, but located within a first frequency band BAND1.

The third carrier aggregation scenario 33 illustrates inter-band non-contiguous carrier aggregation, in which component carriers that are non-adjacent in frequency and in multiple frequency bands are aggregated. For example, the third carrier aggregation scenario 33 depicts aggregation of component carriers $f_{UL1}$ and $f_{UL2}$ of a first frequency band BAND1 with component carrier $f_{UL3}$ of a second frequency band BAND2.

Figure 2C:
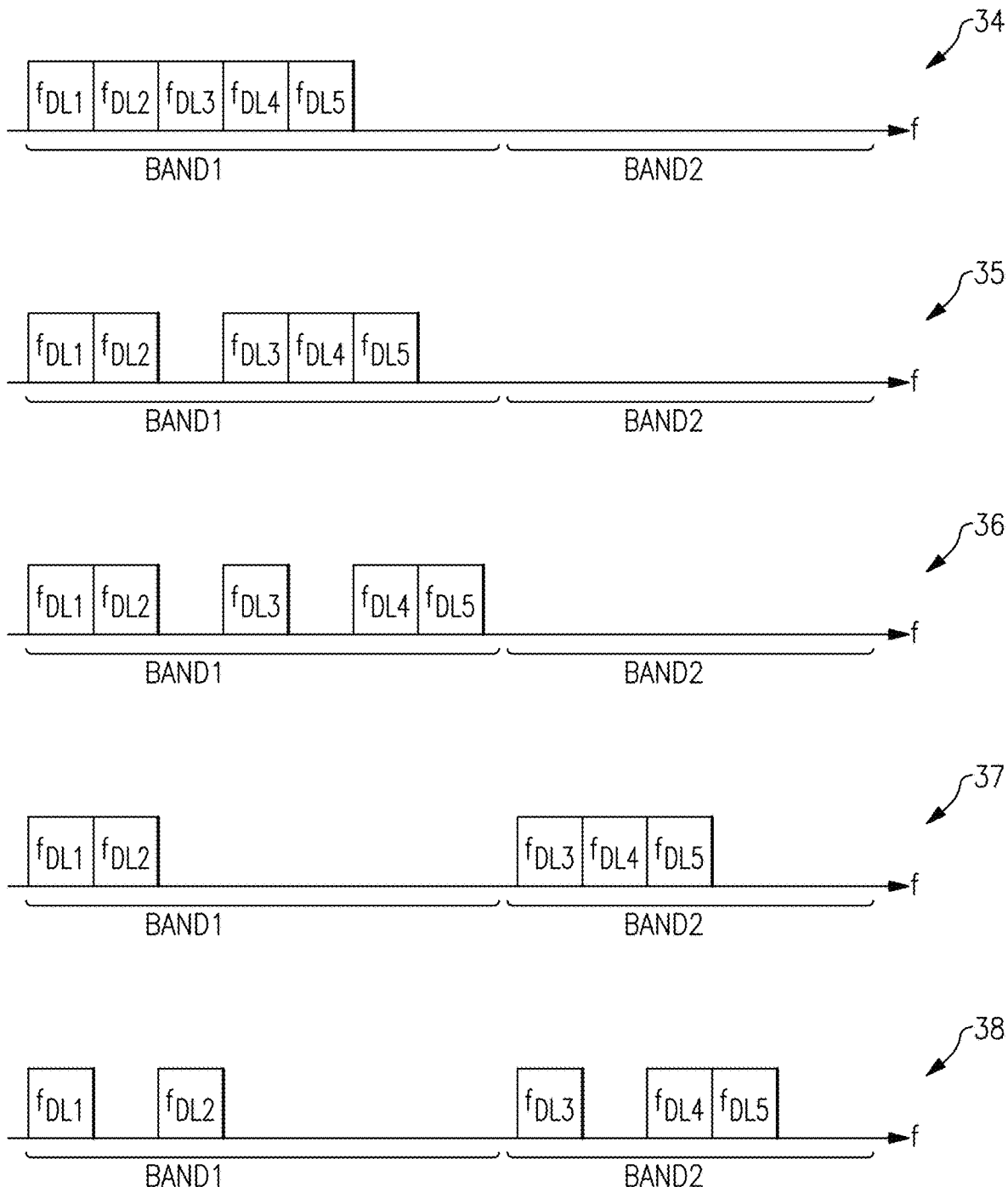
FIG. 2C illustrates various examples of downlink carrier aggregation for the communication link of FIG. 2A.

FIG. 2C illustrates various examples of downlink carrier aggregation for the communication link of FIG. 2A. The examples depict various carrier aggregation scenarios 34-38 for different spectrum allocations of a first component carrier $f_{DL1}$, a second component carrier $f_{DL2}$, a third component carrier $f_{DL3}$, a fourth component carrier $f_{DL4}$, and a fifth component carrier $f_{DL5}$. Although FIG. 2C is illustrated in the context of aggregating five component carriers, carrier aggregation can be used to aggregate more or fewer carriers. Moreover, although illustrated in the context of downlink, the aggregation scenarios are also applicable to uplink.

The first carrier aggregation scenario 34 depicts aggregation of component carriers that are contiguous and located within the same frequency band. Additionally, the second carrier aggregation scenario 35 and the third carrier aggregation scenario 36 illustrates two examples of aggregation that are non-contiguous, but located within the same frequency band. Furthermore, the fourth carrier aggregation scenario 37 and the fifth carrier aggregation scenario 38 illustrates two examples of aggregation in which component carriers that are non-adjacent in frequency and in multiple frequency bands are aggregated. As a number of aggregated component carriers increases, a complexity of possible carrier aggregation scenarios also increases.

With reference to FIGS. 2A-2C, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Certain communication networks allocate a particular user device with a primary component carrier (PCC) or anchor carrier for uplink and a PCC for downlink. Additionally, when the mobile device communicates using a single frequency carrier for uplink or downlink, the user device communicates using the PCC. To enhance bandwidth for uplink communications, the uplink PCC can be aggregated with one or more uplink secondary component carriers (SCCs). Additionally, to enhance bandwidth for downlink communications, the downlink PCC can be aggregated with one or more downlink SCCs.

In certain implementations, a communication network provides a network cell for each component carrier. Additionally, a primary cell can operate using a PCC, while a secondary cell can operate using a SCC. The primary and second cells may have different coverage areas, for instance, due to differences in frequencies of carriers and/or network environment.

License assisted access (LAA) refers to downlink carrier aggregation in which a licensed frequency carrier associated with a mobile operator is aggregated with a frequency carrier in unlicensed spectrum, such as WiFi. LAA employs a downlink PCC in the licensed spectrum that carries control and signaling information associated with the communication link, while unlicensed spectrum is aggregated for wider downlink bandwidth when available. LAA can operate with dynamic adjustment of secondary carriers to avoid WiFi users and/or to coexist with WiFi users. Enhanced license assisted access (eLAA) refers to an evolution of LAA that aggregates licensed and unlicensed spectrum for both downlink and uplink.

Figure 3A:
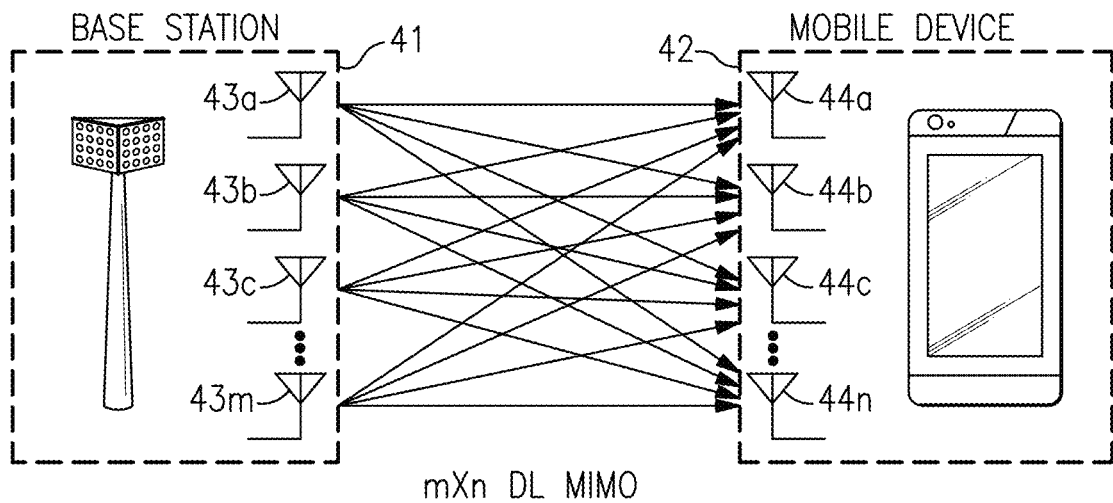
FIG. 3A is a schematic diagram of one example of a downlink channel using multi-input and multi-output (MIMO) communications.
Figure 3B:
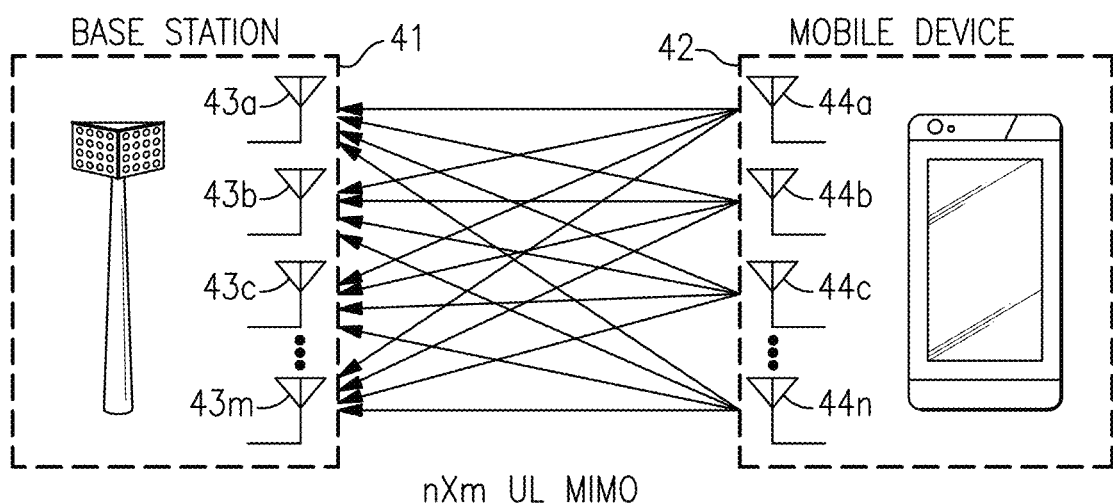
FIG. 3B is schematic diagram of one example of an uplink channel using MIMO communications.

FIG. 3A is a schematic diagram of one example of a downlink channel using multi-input and multi-output (MIMO) communications. FIG. 3B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 3A, downlink MIMO communications are provided by transmitting using M antennas 43a, 43b, 43c, . . . 43m of the base station 41 and receiving using N antennas 44a, 44b, 44c, . . . 44n of the mobile device 42. Accordingly, FIG. 3A illustrates an example of m×n DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 3B, uplink MIMO communications are provided by transmitting using N antennas 44a, 44b, 44c, . . . 44n of the mobile device 42 and receiving using M antennas 43a, 43b, 43c, . . . 43m of the base station 41. Accordingly, FIG. 3B illustrates an example of n×m UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 3C:
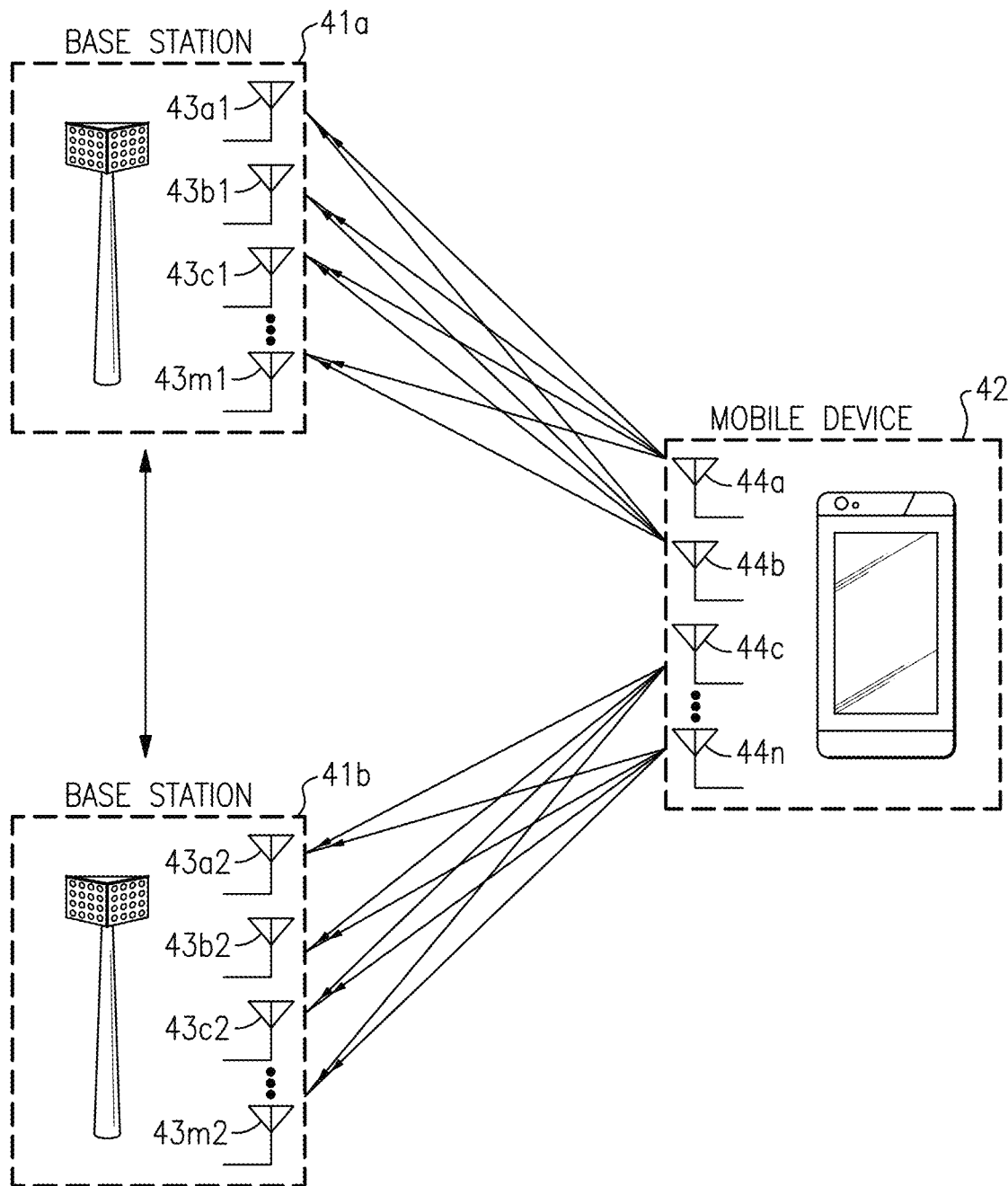
FIG. 3C is schematic diagram of another example of an uplink channel using MIMO communications.

FIG. 3C is schematic diagram of another example of an uplink channel using MIMO communications. In the example shown in FIG. 3C, uplink MIMO communications are provided by transmitting using N antennas 44a, 44b, 44c, . . . 44n of the mobile device 42. Additionally, a first portion of the uplink transmissions are received using M antennas 43a1, 43b1, 43c1, . . . 43m1 of a first base station 41a, while a second portion of the uplink transmissions are received using M antennas 43a2, 43b2, 43c2, . . . 43m2 of a second base station 41b. Additionally, the first base station 41a and the second base station 41b communication with one another over wired, optical, and/or wireless links.

The MIMO scenario of FIG. 3C illustrates an example in which multiple base stations cooperate to facilitate MIMO communications.

Examples of Beamforming Communication Systems with Crossbar Switches

Antenna arrays can be used in a wide variety of applications. For instance, antenna arrays can be used to transmit and/or receive radio frequency (RF) signals in base stations, network access points, mobile phones, tablets, customer-premises equipment (CPE), laptops, computers, wearable electronics, and/or other communication devices.

Communication devices that utilize millimeter wave carriers (for instance, 30 GHz to 300 GHz), centimeter wave carriers (for instance, 3 GHz to 30 GHz), and/or other carrier frequencies can employ an antenna array to provide beam formation and directivity for transmission and/or reception of signals.

For example, in the context of signal transmission, the signals from the antenna elements of the antenna array combine using constructive and destructive interference to generate an aggregate transmit signal exhibiting beam-like qualities with more signal strength propagating in a given direction away from the antenna array. In the context of signal reception, more signal energy is received by the antenna array when the signal is arriving from a particular direction. Accordingly, an antenna array can also provide directivity for reception of signals. This directivity can be expressed as antenna array gain as compared to an antenna having an omni-directional signal reception or transmission characteristic.

Beamforming communication systems with crossbar switches are provided herein. In certain embodiments, a beamforming communication system includes an antenna array partitioned into a plurality of sub-arrays, a plurality of front-end channels each operatively associated with one of the sub-arrays, a plurality of data conversion channels, and a crossbar switch electrically connected between the data conversion channels and the front-end channels. Including the crossbar switch allows for a flexible allocation of the data conversion channels to the front-end channels and subsequently to each individual antenna element in the array.

For example, with respect to transmit, any digital-to-analog converter (DAC) can be used to generate the transmit signal processed by any front-end channel or grouping of front-end channels forming a sub-array. Furthermore, with respect to receive, any analog-to-digital converter (ADC) can handle the receive signal from any front-end channel or grouping of front-end channels.

Implementing the beamforming communication system in this manner provides a variety of advantages. In one example, any sub-array(s) can be used to receive while any sub-array(s) can be used in transmit, and thus the allocation of sub-arrays for transmit and receive can be dynamically adjusted based on blockage, network requirements, and/or usage scenarios. In another example, a single data conversion channel can be coupled to the front-end circuits associated with multiple sub-arrays, thereby allowing a common signal to be communicated using more than one sub-array. Accordingly, data conversion channels can be flexibly allocated to signal polarizations (for example, horizontal or vertical) and/or to carrier frequencies.

The crossbar switch can also be used to control fan in and fan out of transmit and receive signals. In one example, the crossbar switch can connect one of the data conversion channels to multiple front-end channels. In another example, the crossbar switch can connect multiple data conversion channels to one front-end channel.

Furthermore, another advantage to flexible allocation using the crossbar switches is that any particular sub-array of n×m front-end channels could be expanded to k×j (where one or both of k,j>n,m) to effectively improve the gain of that sub-array or conversely reducing the number of front-end channels to l×r (where one or both of l,r<n,m) to effectively reduce the gain of that sub-array. Such flexibility in either a static or dynamic allocation of front-end channels can be used In certain implementations, the number of data conversion channels is equal to the number of front-end channels. In the extreme, one data conversion channel is connected to one RF path terminating in one antenna element. However, other implementations are possible. In one example, additional data conversion channels are provided for redundancy. Such redundancy not only can enhance flexibility, but also provide a fail-safe in the event that a data conversion channel is or becomes defective and/or inoperable.

The crossbar switch is positioned between the data conversion channels and the front-end channels (that is, before amplification on the transmit path or after amplification on the receive path), and thus provides low energy loss relative to a configuration in which switching is performed on high power RF signals.

One or more sets of mixers used for frequency upconversion and frequency downconversion can be placed along the signal path between the data converters and the antennas. In certain implementations, the mixers are included in the data conversion channels. However, other implementations are possible, such as configurations in which the mixers are positioned between the crossbar switch and the front-end channels.

The crossbar switch can connect any of the data conversion channels to any of the front-end channels. In certain implementations, the crossbar switch is implemented with controllable gain. For example, separately controllable amplifiers and/or attenuators can be included at each output of the crossbar switch so that the signal level of that output can be controlled. Such gain control can be particularly beneficial in configurations in which the crossbar switch operates with a fan out or fan in that is not equal to 1.

In certain implementations, the RF channels are each implemented on an RF module that includes a module substrate and RF components attached to the module substrate. Additionally, the antenna elements can be integrated in the RF module (for instance, using patch antenna elements formed on the module substrate). Thus, the beamforming communication system can be implemented using a modular and scalable approach in which RF modules are aggregated to achieve the desired overall array configuration and size. Combining modularization and a crossbar switches provides even further benefits in terms of flexibility and scalability (dynamic or static). For example, massive multiple-input multiple-output (MIMO) systems can be realized with lower cost, faster deployment, and/or enhanced performance.

Figure 4:
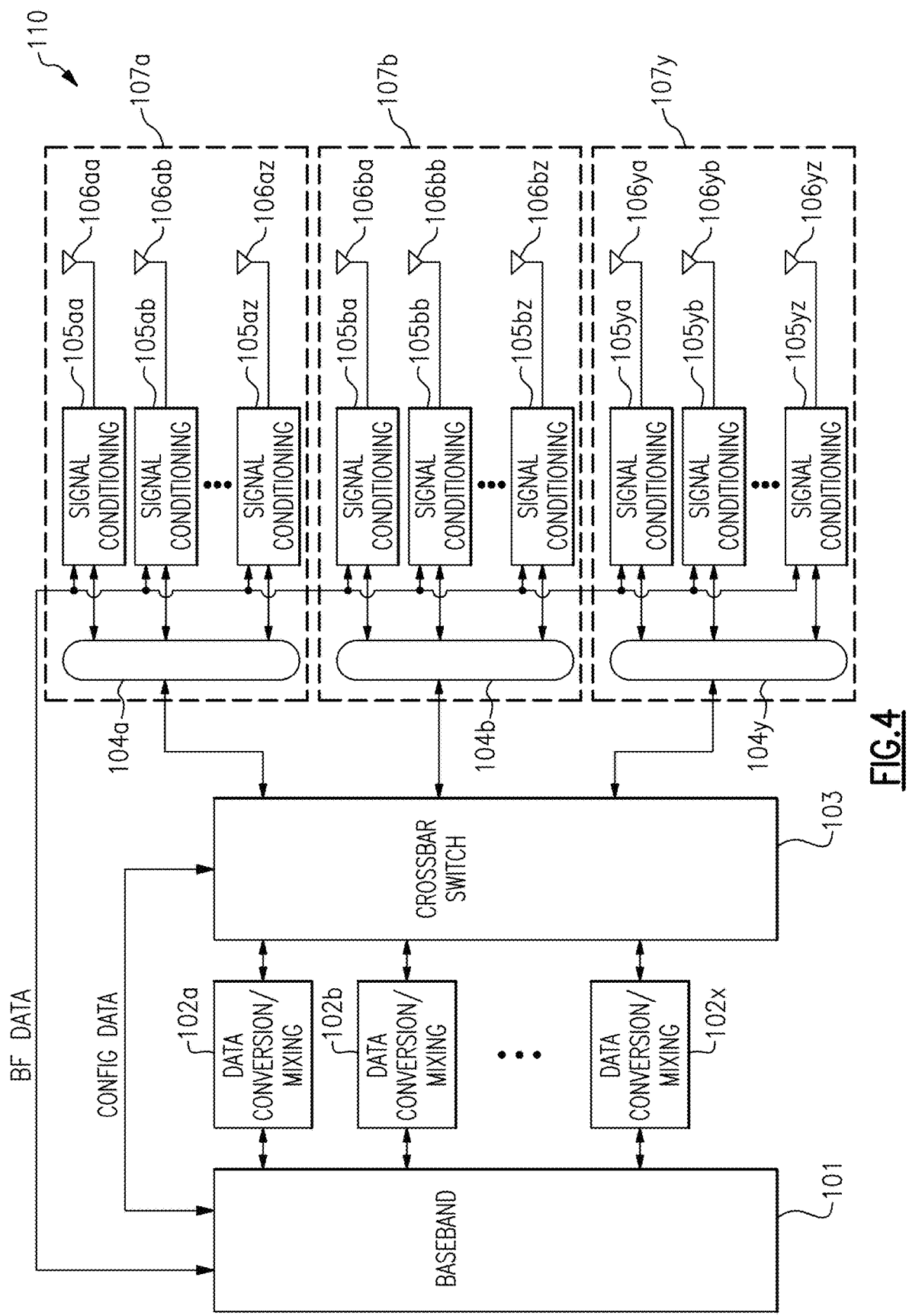
FIG. 4 is a schematic diagram of one embodiment of a beamforming communication system.

FIG. 4 is a schematic diagram of one embodiment of a beamforming communication system 110. The beamforming communication system 110 includes a baseband circuit 101, data conversion/mixing channels 102a, 102b, . . . 102x, a crossbar switch 103, and RF channels 107a, 107b, . . . 107y. In the illustrated embodiment, the RF channels 107a, 107b, 107n are associated with RF splitters/combiners 104a, 104b, . . . 104y, signal conditioning circuits 105aa, 105ab, . . . 105az, 105ba, 105bb, . . . 105bz, . . . 105ya, 105yb, . . . 105yz, and antennas 106aa, 106ab, . . . 106az, 106ba, 106bb, . . . 106bz, . . . 106ya, 106yb, . . . 106yz.

In the illustrated embodiment, the crossbar switch 103 serves to connect any of the data conversion/mixing channels 102a, 102b, . . . 102x (x in number) to any of the RF channels 107a, 107b, . . . 107y (y in number). The number of data conversion/mixing channels can be equal to or different than the number of RF channels.

Although FIG. 4 depicts the mixers as being in the data conversion channels, the teachings herein are also applicable to other configurations. For example, the crossbar switch can be positioned between the data converters and the mixers used for frequency upconversion and downconversion. Thus, the mixers can be positioned between a crossbar switch and an antenna array rather than being incorporated into the data conversion channels.

Including the crossbar switch allows for a flexible allocation of the data conversion channels to RF channels. For example, with respect to transmit, any DAC/upconverting mixer can be used to generate the RF transmit signal processed by any front-end channel. Furthermore, with respect to receive, any ADC/downconverting mixer can handle the RF receive signal from any front-end channel or combination of front-end channels.

As shown in FIG. 4, the crossbar switch 103 is positioned after the data conversion/mixing circuits, and thus is in the analog domain rather than the digital domain. In accordance with the teachings herein, a crossbar switch is provided at either intermediate frequency (IF) or RF.

In the illustrated embodiment, the antenna array has been partitioned into y groups of z antennas, where y and z can be any desired number. In certain implementations, both y and z are greater than or equal to 2.

Each of the RF channels 107a, 107b, . . . 107z is associated with an RF splitter/combiner that is coupled to the crossbar switch 103. Each RF splitter/combiner in turn is associated with z signal conditioning circuits, in this embodiment. Although shown as a single RF splitter/combiner, in another embodiment each RF channel includes a separate RF splitter and RF combiner (see for example, the embodiment of FIG. 6B).

The signal conditioning circuits can be implemented in a variety of ways. In certain embodiments, an RF signal conditioning circuit includes at least one controllable phase shifter and at least one controllable amplifier to aid in controlling gain and phase settings associated with a particular antenna. Thus, the gain and phase settings can be controlled to provide beamforming in the analog domain.

The baseband circuit 101 (for example, a baseband processor) generates transmit data streams that are provided to the data conversion/mixing channels 102a, 102b, . . . 102x, and processes receive data streams from the data conversion/mixing channels 102a, 102b, . . . 102x. The baseband circuit 101 is also coupled to the crossbar switch 103 to communicate configuration data. Since the crossbar switch 103 flexible connects the data conversion/mixing channels 102a, 102b, . . . 102x to the RF channels 107a, 107b, . . . 107y, the beamforming communication system 110 exhibits great flexibility between mapping digital data streams to RF channels.

In certain implementations, transmit data streams from two or more data conversion/mixing channels are provided to the same RF channel(s). For example, transmit signals associated with different signal polarizations and/or different carriers can be provided to a common RF channel or set of RF channels.

As shown in FIG. 4, the baseband circuit 101 provides beamforming data (BF DATA) for controlling the gain and phase of the signal conditioning circuits to provide RF beamforming for transmit and/or receive. For example, each signal conditioning circuit can include a phase shifter having a phase shift setting set by the baseband circuit 101.

The crossbar configuration of FIG. 4 provides an advantage over other beamforming architectures, such as a hybrid architecture. For example, in a hybrid configuration, each DAC/ADC pair is physically hard wired to a distinct sub-set of antenna elements (for instance, 8×8 elements each). Thus, when sending identical data to each DAC/ADC pair, the mm-Wave aperture grows to 16×8 antenna elements when two sub-sets of antennas are adjacent to each other. This is equivalent to sending the data to one DAC/ADC pair and using the cross-bar to fan that signal out to the sub array of 16×8 antenna elements. Accordingly, one advantage of the cross-bar over the hybrid configuration with fixed arrays is that you cannot reduce the size of the aperture to something less than the fixed size (for instance, from 8×8 to 4×4 antenna elements). Moreover, choosing to use one DAC/ADC pair saves power consumption over using two DAC/ADC pairs because, typically, the DAC/ADCs are the most power hungry components in the system.

Including the crossbar switch 104 permits part of the antenna array 110 to be configured to send a beam leveraging a bounced signal and thereby enable MIMO operation. For example, using the crossbar switch 103, the same DAC/ADC pair can be used for that other MIMO beam.

Furthermore, the crossbar switch 104 permits part of the antenna array 119 to be used to find alternative paths using a separate beam in order to replace the main beam if interrupted. For example, using the crossbar switch 104, the same DAC/ADC pair can be used for that other beam that is searching for an alternate path.

Accordingly, the inclusion of the crossbar switch 104 provides a number of advantages over other beamforming systems.

Figure 5:
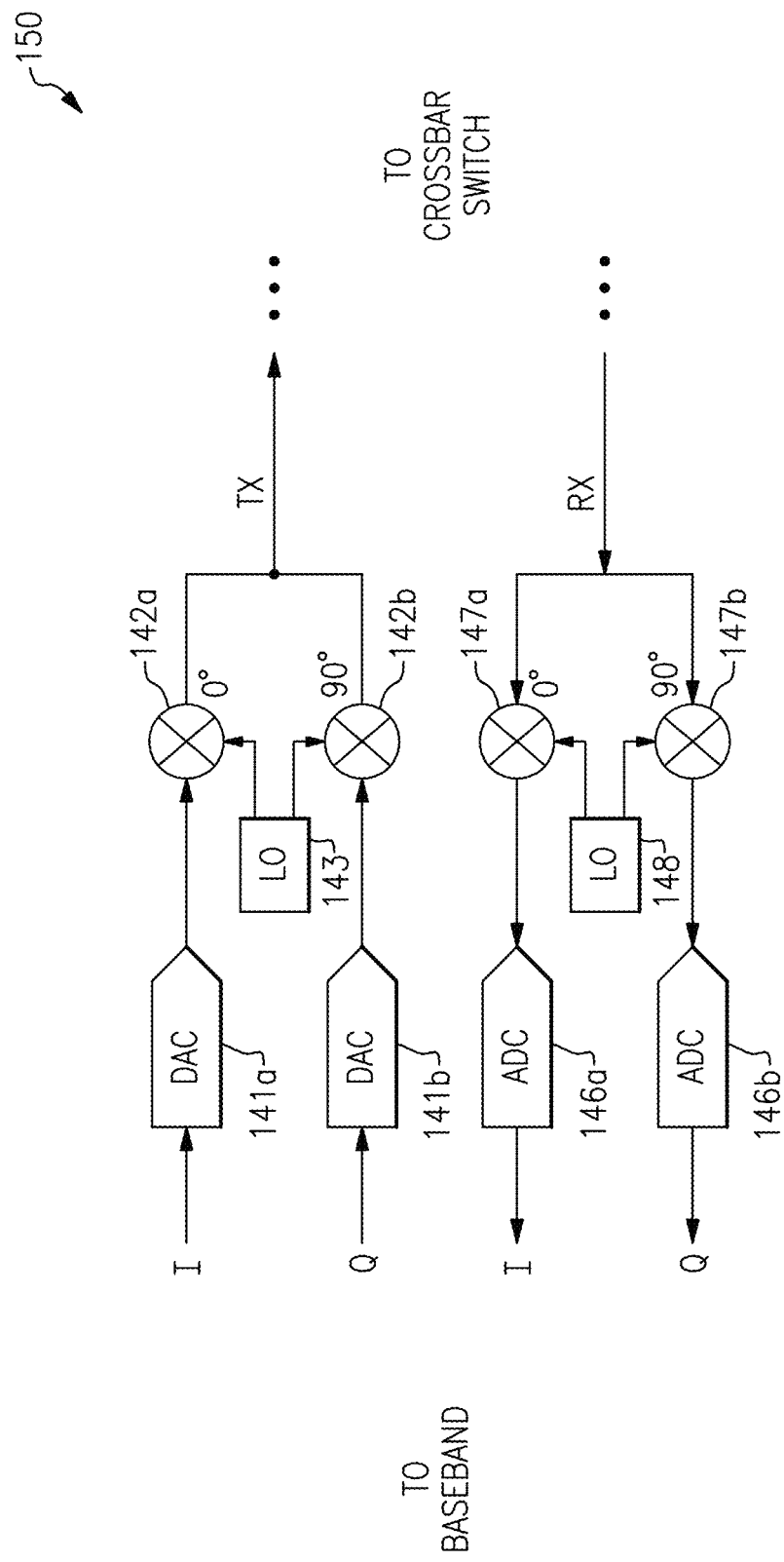
FIG. 5 is a schematic diagram of a data conversion/mixing channel according to one embodiment.

FIG. 5 is a schematic diagram of a data conversion/mixing channel 150 according to one embodiment. In the illustrated embodiment, the data conversion/mixing channel 150 includes an I-path transmit DAC 141a, a Q-path transmit DAC 141b, an I-path upconverting mixer 142a, a Q-path upconverting mixer 142b, a transmit local oscillator (LO) 143, an I-path receive ADC 146a, a Q-path receive ADC 146b, an I-path downconverting mixer 147a, a Q-path downconverting mixer 147b, and a receive LO 148.

Although one embodiment of a data conversion/mixing channel is depicted, the teachings herein are applicable to data conversion/mixing channels implemented in other ways including, but not limited to, super heterodyne up/down conversion.

In the illustrated embodiment, digital in-phase (I) and quadrature-phase (Q) transmit signals are provided from baseband to the transmit DACs 141a-141b, which process the digital I and Q transmit signals to generate analog I and Q transmit signals. The analog I and Q transmit signals are upconverted using the upconverting mixers 142a-142b to generate an RF transmit signal TX for the crossbar switch. Additionally, an RF receive signal RX from the crossbar switch is down-converted by the down-converting mixers 147a-147b to generate analog I and Q receive signals. The receive ADCs 146a-146b digitize the analog I and Q receive signals to generate digital I and Q receive signals for baseband processing. The transmit LO 143 and receive LO 148 generate a frequency tone for frequency conversion.

Figure 6A:
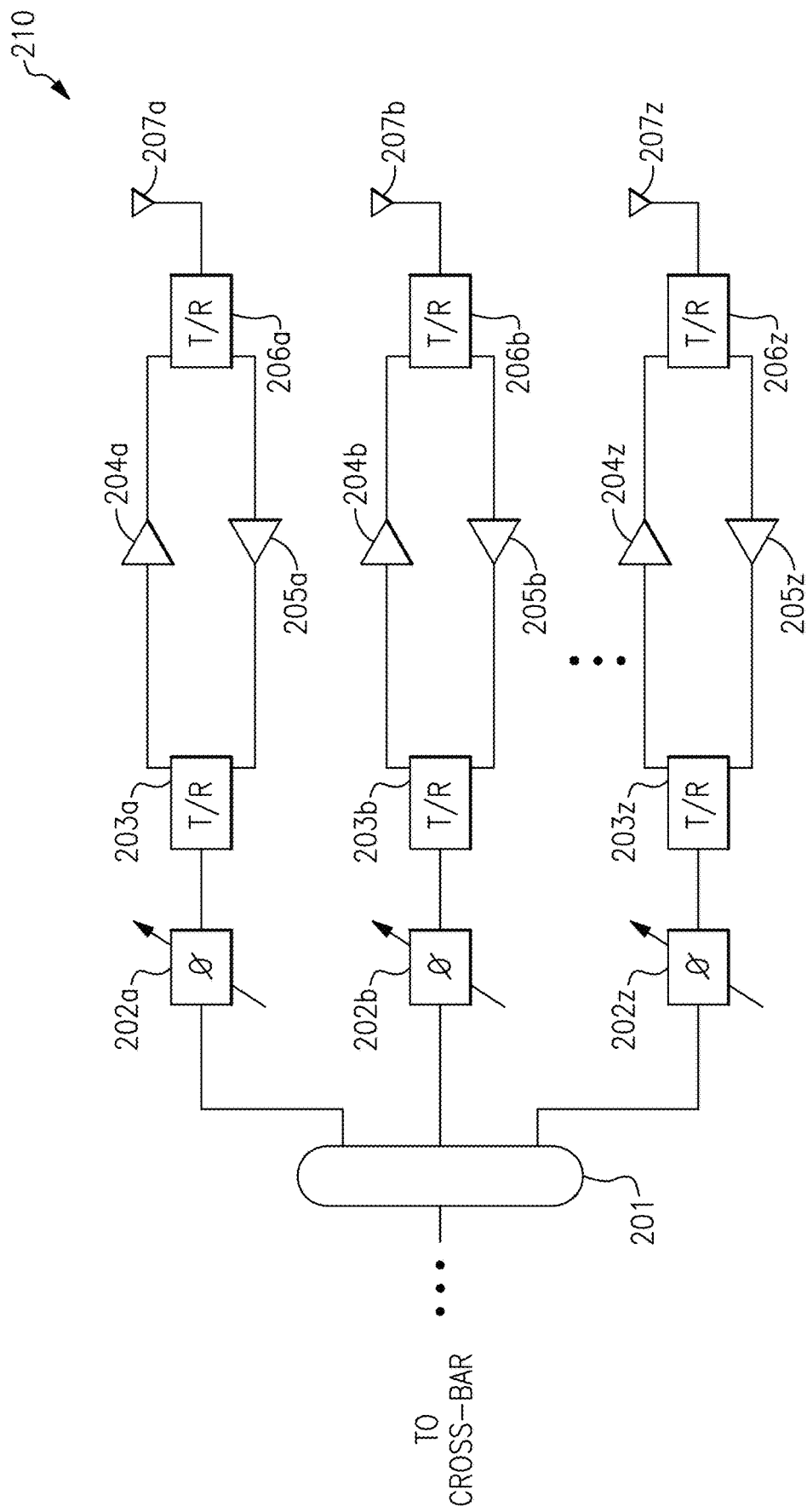
FIG. 6A is a schematic diagram of an RF channel according to one embodiment.

FIG. 6A is a schematic diagram of an RF channel 210 according to one embodiment. The RF channel 210 includes an RF splitter/combiner 201, phase shifters 202a, 202b, . . . 202z, a first group of transmit/receive (T/R) switches 203a, 203b, . . . 203z, power amplifiers 204a, 204b, . . . 204z, low noise amplifiers (LNAs) 205a, 205b, . . . 205z, a second group of T/R switches 206a, 206b, . . . 206z, and antennas 207a, 207b, . . . 207z.

In the illustrated embodiment, T/R switches are used to selecting the power amplifiers for transmit or the LNAs for receive. Thus, the RF channel 210 is suitable for time division duplexing (TDD). Additionally, the RF splitter/combiner 201 is shared for the transmit and receive directions, thus reducing RF signal routes.

Although one embodiment of an RF channel is depicted, the teachings herein are applicable to RF channels implemented in a wide variety of ways. Accordingly, other implementations are possible.

Figure 6B:
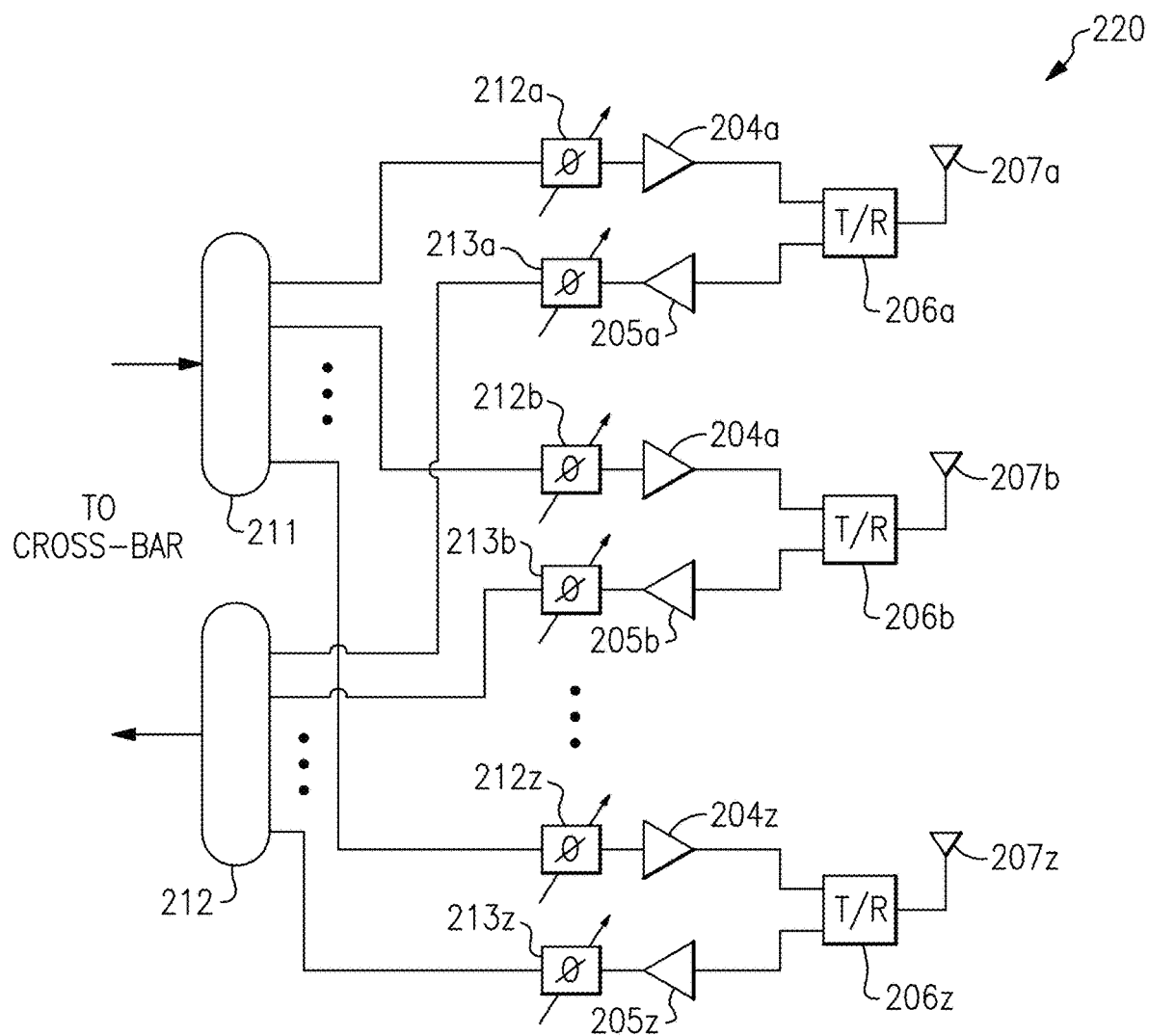
FIG. 6B is a schematic diagram of an RF channel according to another embodiment.

FIG. 6B is a schematic diagram of an RF channel 220 according to another embodiment. The RF channel 220 includes an RF splitter 211, an RF combiner 212, a first group of phase shifters 212a, 212b, . . . 212z, a second group of phase shifters 213a, 213b, . . . 213z, power amplifiers 204a, 204b, . . . 204z, LNAs 205a, 205b, . . . 205z, T/R switches 206a, 206b, . . . 206z, and antennas 207a, 207b, . . . 207z.

The RF channel 220 illustrated another embodiment of an RF channel. However, the teachings herein are applicable to RF channels implemented in a wide variety of ways. Accordingly, other implementations are possible.

Figure 7:
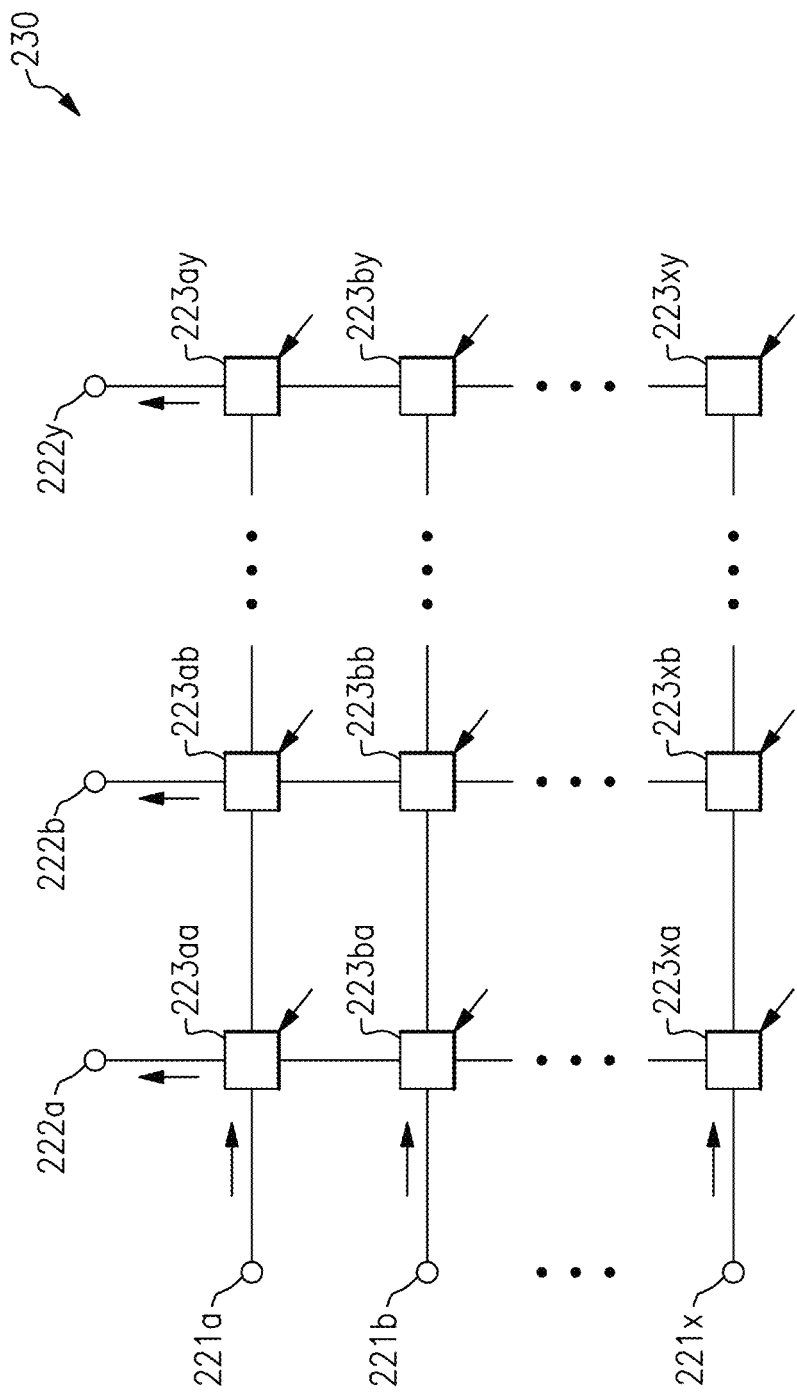
FIG. 7 is a schematic diagram of a crossbar switch according to one embodiment.

FIG. 7 is a schematic diagram of a crossbar switch 230 according to one embodiment. The crossbar switch 230 includes input terminals 221a, 221b, . . . 222x, output terminals 222a, 222b, . . . 222y, and switches 223aa, 223ab, . . . 223ay, 223ba, 223bb, . . . 223by, . . . 223xa, 223xb, . . . 223xy.

Although one embodiment of a crossbar switch is depicted, the teachings herein are applicable to crossbar switches implemented in a wide variety of ways. Accordingly, other implementations are possible.

The switches 223aa, 223ab, . . . 223ay, 223ba, 223bb, . . . 223by, . . . 223xa, 223xb, . . . 223xy can be used to connected one or more of the input terminals 221a, 221b, . . . 222x to one or more of the output terminals 222a, 222b, . . . 222y. Accordingly, the crossbar switch 230 allows for a flexible mapping between input terminals and output terminals.

Beamforming Communication Systems Implemented with Modular Front-Ends

Millimeter wave (mmW) 3GPP and/or 5G FR2 wireless communications may use beamforming to overcome signal path loss. Antenna configurations and array size are determined by the target applications and may vary from large arrays such as 32×32 antenna elements to small arrays such as 2×8 antenna elements that are more suited for mobile handsets and Internet of Things (IoT) devices. The phase relationship of the RF signal between adjacent antenna elements enables steerable directivity of the radio signal as compared to an omni-antenna or parabolic antenna often use in fixed-link microwave and mmW communications. Electronic control of the signal phase and amplitude at each antenna element in the antenna array enables beam steering and control of the signal power along with tracking of a mobile radio user.

For example, customer premises equipment (CPE) might use an array of 8×8 antenna elements (each supported by a dedicated RF signal path including power amplifiers (PA), low noise amplifiers (LNA), switches, etc.). Whereas in contrast, a laptop developer might choose a 2×8 antenna array suitable for indoor mmW radio links. The radio link margin and signal-to-noise ratio (SNR) context of the CPE unit may require an 8×8 array in order to form a focused RF beam to reach its corresponding radio unit at the other end of the radio link. Correspondingly, each radio integrator will choose a specific antenna array configuration that satisfies the radio link requirements. In addition to the antenna array size, also the split between phased array and digital beamforming technology can vary across different applications.

Beamforming communication systems with modular front-ends are provided herein. In certain embodiments, a beamforming communication system includes an antenna array partitioned into a plurality of sub-arrays, and a plurality of front-end modules each operatively associated with one of the sub-arrays. Each of the front-end modules includes at least two radio frequency (RF) transmit channels and at least two RF receive channels. Thus, the signals transmitted and received on the antenna array are processed using a multiple front-end modules servicing sub-arrays.

In certain implementations, each of the front-end modules includes an up/down conversion circuit for providing frequency upconversion to a transmit signal to generate RF transmit signals for the at least two RF transmit channels, and for providing frequency downconversion to RF receive signals from the at least two RF receive channels to generate a receive signal. The transmit signal and the receive signal can correspond to intermediate frequency (IF) signals or baseband band signals (for instance, represented using analog signaling).

The RF transmit channels and the RF receive channels can provide a variety of RF signal processing functions (any of which can be controllable), such as gain, phase shifting, and/or filtering.

Accordingly, within one front-end module all core RF functions for mmW and/or FR2 signals (for instance, 24.25 GHz or higher) radio signals are incorporated including mmW and/or FR2 signal generation and conditioning. Moreover, in certain implementations, the antenna elements are integrated into the front-end module.

In one example, one module component includes a two-by-two (2×2) antenna array suitable of RF communications at 28 GHz (for instance, 5G NR FR2 frequency bands), and is capable of being placed into a mosaic of other identical modules to build up larger arrays. Thus, mmW and/or FR2 product developers are able to quickly and flexibly build-up specific phased array antenna configurations as well as hybrid combinations of phased arrays and MIMO technology (hybrid beamforming) by deploying a number of modules. Accordingly, smaller system integrators and RF product application developers will be able to use modules to quickly build flexible phased array antennas (with all the associated RF generation and signal conditioning circuitry) used, for instance, for the 24-29.5 GHz frequency bands as allocated in each jurisdictional region. New applications that will leverage high bandwidth wireless communications are enabled through the use of such modules.

The front-end modules can be implemented to communicate with one another, including by passing local oscillator (LO) signals used for mixed and/or passing transmit or receive data streams. The ability of each module to work with adjacent modules in a flexible and reconfigurable manner solves a number problems of diverse use-case applications for mmW and/or FR2 communications.

For example, in certain implementations each front-end module is programmed and can share operating data and calibration with its neighbors in order to operate as part of a larger array. Thus, each module can have a control plane and an ability to configure each RF path in the system on both receive and transmit cycles for TDD applications.

The front-end modules herein can provide energy efficient RF signal generation and amplification in a compact modular form factor. Such modularization can reduce energy consumption, for instance, by 30% or more in a multitude of radio links leveraging the mmW and/or FR2 frequency bands by reusing, for example, the LO signal from one module in the other modules.

Furthermore, such front-end modules can be implemented using hybrid packaging technology, thereby combining the technological advantages of conventional wafer-level packaging approaches with the cost-efficiency and thermal management capabilities of panel-level printed circuit board fabrication (system-in-PCB).

In certain embodiments, modular front-ends are combined with a cross-bar switch to further enhance flexibility. For example, any of the modular front-ends herein can be used in combination with any of the cross-bar switches herein to form highly flexible and scalable communication systems.

The modular front-ends can be used not only in ground-based cellular applications (for instance, mmW 3GPP and/or 5G FR2 wireless communications), but also satellite communications (SatCom) leveraging the mmW spectrum. Such SatCom applications can include those associated with a variety of orbits, such as Geostationary Equatorial Orbit (GEO), Medium Earth Orbit (MEO), or Low Earth Orbit (LEO).

Figure 8:
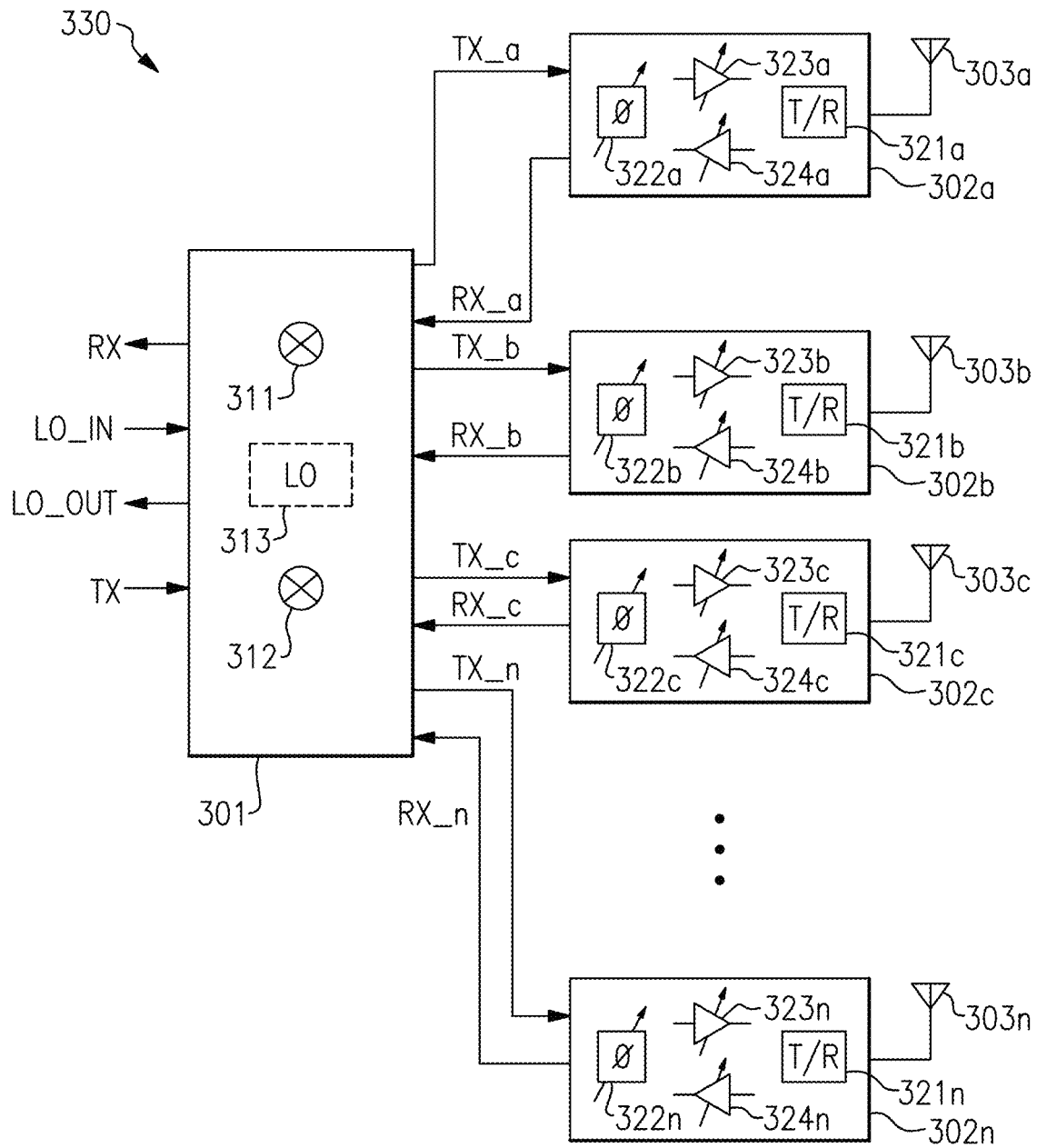
FIG. 8 is a schematic diagram of a modular front-end according to one embodiment.

FIG. 8 is a schematic diagram of a modular front-end 330 according to one embodiment. The modular front-end 330 includes an up/down conversion circuit 301 (also referred to herein as a frequency conversion circuit), transmit and receive channels 302a, 302b, 302c, . . . 302n, and antenna elements 303a, 303b, 303c, . . . 303n corresponding to sub-array.

The modular front-end 330 services a portion of an antenna array (also referred to herein as a sub-array) associated with the antenna elements 303a, 303b, 303c, . . . 303n. Accordingly, two or more instantiations of the modular front-end 330 are used to serve a larger antenna array. Accordingly, the modular front-ends can be deployed with flexibility and scalability to accommodate the antenna array size associated with a particular application.

In the illustrated embodiment, the up/down conversion 301 includes a downconverting mixer 311, an upconverting mixer 312, and a local oscillator (LO) 313. The LO 313 serves to generate a frequency tone used for providing mixing. For example, the LO 313 can be used to generate a 28 GHz tone for upconverting the transmit signal TX to generate RF transmit signals TX_a, TX_b, TX_c, . . . TX_n for the transmit and receive channels 302a, 302b, 302c, . . . 302n, respectively. Additionally or alternatively, the LO 313 can be used to generate a 28 GHz tone for downconverting the RF receive signals RX_a, RX_b, RX_c, . . . RX_n to generate the receive signal RX.

The transmit signal TX and the receive signal RX can correspond to IF signals or baseband signals, for instance, represented in an analog format.

Accordingly, in the illustrated embodiment, the modular front-end 330 operates to communicate a common transmit stream (TX) and a common receive stream (RX) with a radio transceiver.

As shown in FIG. 8, the up/down conversion 301 also can receive an LO input signal LO_IN or provide an LO output signal LO_OUT. In certain implementations, the LO input signal LO_IN can be provided from another module to enable mixing with a shared LO signal when multiple modules are placed in a mosaic or array. Furthermore, the LO input signal LO_OUT can be provided to other module(s) as desired. Such configurability for mixing can be provided in a number of ways including, but not limited to, by digital programming over an interface of the front-end 330.

In the illustrated embodiment, each of the transmit and receive channels 302a, 302b, 302c, ... 302n is implemented with a number of functionalities. For instance, in this embodiment the transmit and receive channels 302a, 302b, 302c, ... 302n include transmit/receive switches 321a, 321b, 321c, ... 321n, controllable phase shifters 322a, 322b, 322c, ... 322n, controllable transmit amplifiers 323a, 323b, 323c, ... 323n, and controllable receive amplifiers 324a, 324b, 324c, ... 324n. Although example RF signal processing and conditioning is depicted, other functionality (including but not limited to filtering, coupling, and/or sensing) can be included in a channel.

Although four transmit and receive channels 302a, 302b, 302c, ... 302n are depicted, more or fewer transmit and receive channels 302a, 302b, 302c, ... 302n can be included. For example, 2, 3, 4, or more transmit and receive channels can be incorporated into a modular front-end.

Figure 9:
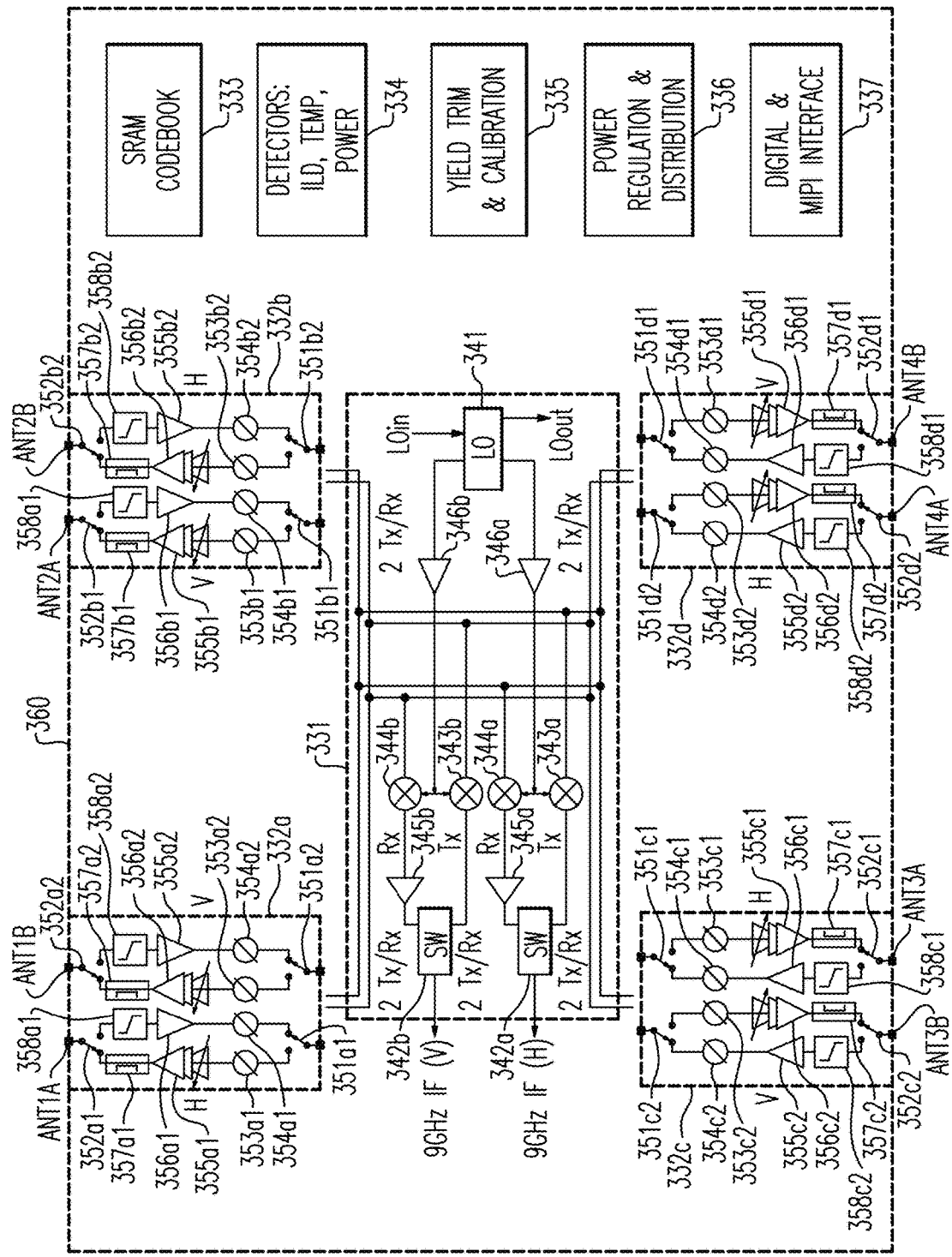
FIG. 9 is a schematic diagram of a modular front-end according to another embodiment.

FIG. 9 is a schematic diagram of a modular front-end 360 according to another embodiment. The modular front-end 360 includes an up/down conversion circuit 331, transmit and receive channels 332a, 332b, 332c, 332d, a memory codebook 333, detectors 334, a trimming and calibration circuit 335, a power regulation and distribution circuit 336, a digital interface 337, and antenna elements ANT1A/ANT1B, ANT2A/ANT2B, ANT3A/ANT3B, ANT4A/ANT4B.

The modular front-end 360 services a portion of an antenna array (also referred to herein as a sub-array) associated with ANT1A/ANT1B, ANT2A/ANT2B, ANT3A/ANT3B, ANT4A/ANT4B. In another embodiment, ANT1A/ANT1B, ANT2A/ANT2B, ANT3A/ANT3B, ANT4A/ANT4B correspond to antenna ports that connect antenna elements of the sub-array.

In the illustrated embodiment, the front-end 360 is implemented to process signals associated with both horizontal (H) antenna polarization and vertical (V) antenna polarization.

The up/down conversion 331 includes an LO 341, a horizontal-path transmit/receive switch 342a, a vertical-path transmit/receive switch 342b, a horizontal-path upconverting mixer 343a, a vertical-path upconverting mixer 343b, a horizontal-path downconverting mixer 344a, a vertical-path downconverting mixer 344b, a horizontal-path receive amplifier 345a, a vertical-path receive amplifier 345b, a horizontal-path LO buffer 346a, and a vertical-path LO buffer 346b.

As shown in FIG. 9, the LO 341 generates a horizontal-path LO signal that is buffered by the horizontal-path LO buffer 346a and used for mixing by the horizontal-path upconverting mixer 343a and the horizontal-path downconverting mixer 344a. Additionally, the LO generates a vertical-path LO signal that is buffered by the vertical-path LO buffer 346b and used for mixing by the vertical-path upconverting mixer 343b and the vertical-path downconverting mixer 344b. The LO 341 can selectively operate (for instance, based on data received over the digital interface 337) based on an LO input signal LOin received from another module, operate using an LO signal generated internally by the LO 341, and/or provide an LO output signal LOout for another module. Thus, the LO signals across multiple modules can be synchronized.

In the illustrated embodiment, the up/down conversion 331 is coupled to a vertical-path IF stream (IF V) and a horizontal-path IF stream (IF H). Based on a state of the transmit/receive switches 342a, 342b, the vertical-path IF stream and the horizontal-path IF stream can be associated with transmit or receive signals, and thus the streams are bidirectional, in this example. Although an example with intermediate frequency data streams is shown, other implementations are possible, such as configurations using analog baseband signals (zero IF).

The up/down conversion 331 provides a horizontal RF transmit signal and a vertical RF transmit signal to each of the transmit and receive channels 332a, 332b, 332c, 332d. Thus, the horizontal RF transmit signal is split to provide a plurality of horizontal RF transmit signals for each channel, and the vertical RF transmit signal is split to provide a plurality of vertical RF transmit signals for each channel. The up/down conversion 331 also receives a horizontal RF receive signal and a vertical RF receive signal from each of the transmit and receive channels 332a, 332b, 332c, 332d. These horizontal RF receive signals are combined and downconverted. Likewise, the vertical RF receive signals are combined and downconverted.

In the illustrated embodiment, each of the transmit and receive channels 332a, 332b, 332c, 332d is implemented with a number of functionalities. For example, in the illustrated embodiment the transmit and receive channels 332a, 332b, 332c, 332d include input side horizontal-path transmit/receive switches 351a1, 351b1, 351c1, 351d1, input side vertical-path transmit/receive switches 351a2, 351b2, 351c2, 351d2, output side horizontal-path transmit/receive switches 352a1, 352b1, 352c1, 352d1, output side vertical-path transmit/receive switches 352a2, 352b2, 352c2, 352d2, horizontal-path transmit phase shifters 353a1, 353b1, 353c1, 353d1, horizontal-path receive phase shifters 354a1, 354b1, 354c1, 354d1, vertical-path transmit phase shifters 353a2, 353b2, 353c2, 353d2, vertical-path receive phase shifters 354a2, 354b2, 354c2, 354d2, horizontal-path transmit amplifiers 355a1, 355b1, 355c1, 355d1, horizontal-path receive amplifiers 356a1, 356b1, 356c1, 356d1, vertical-path transmit amplifiers 355a2, 355b2, 355c2, 355d2, vertical-path receive amplifiers 356a2, 356b2, 356c2, 356d2, horizontal-path couplers 357a1, 357b1, 357c1, 357d1, vertical-path couplers 357a2, 357b2, 357c2, 357d2, horizontal-path filters 358a1, 358a2, 358a3, 358a4, and vertical-path filters 358a2, 358b2, 358c2, 358d2.

Although an example of circuitry for transmit and receive channels is shown, other implementations are possible.

Although four transmit and receive channels 332a, 332b, 332c, 332d are depicted, more or fewer transmit and receive channels 332a, 332b, 332c, 332d can be included.

The memory codebook 333 (including, for instance, a static random access memory or SRAM) can stored a wide variety of settings for operation of the front-end 360. Such settings can include, but are not limited to, gain and phase settings for the transmit and receive channels 332a, 332b, 332c, 332d and/or settings for passing signals amongst front-end modules making up a larger front-end system for a full antenna array.

The front-end 360 also includes the detectors 334 for providing a number of detection functionalities, such as those associated with current, temperature, and/or power. Additionally, a trimming and calibration circuit 335 is included for providing adjustments to one or more components of the front-end 360 to account for manufacturing variations. The power regulation and distribution circuit 336 provides a number of power management functions. The digital interface 337 aids in communicating with other components of a communication system, such as a baseband processor, a transceiver, and/or other front-ends.

The front-end 360 can service a wide range of frequency bands. In one example, the front-end 360 services one or more FR2 bands, such as a 5G NR bands n258/n257 (24.25 Ghz to 29.5 GHz).

Figure 10:
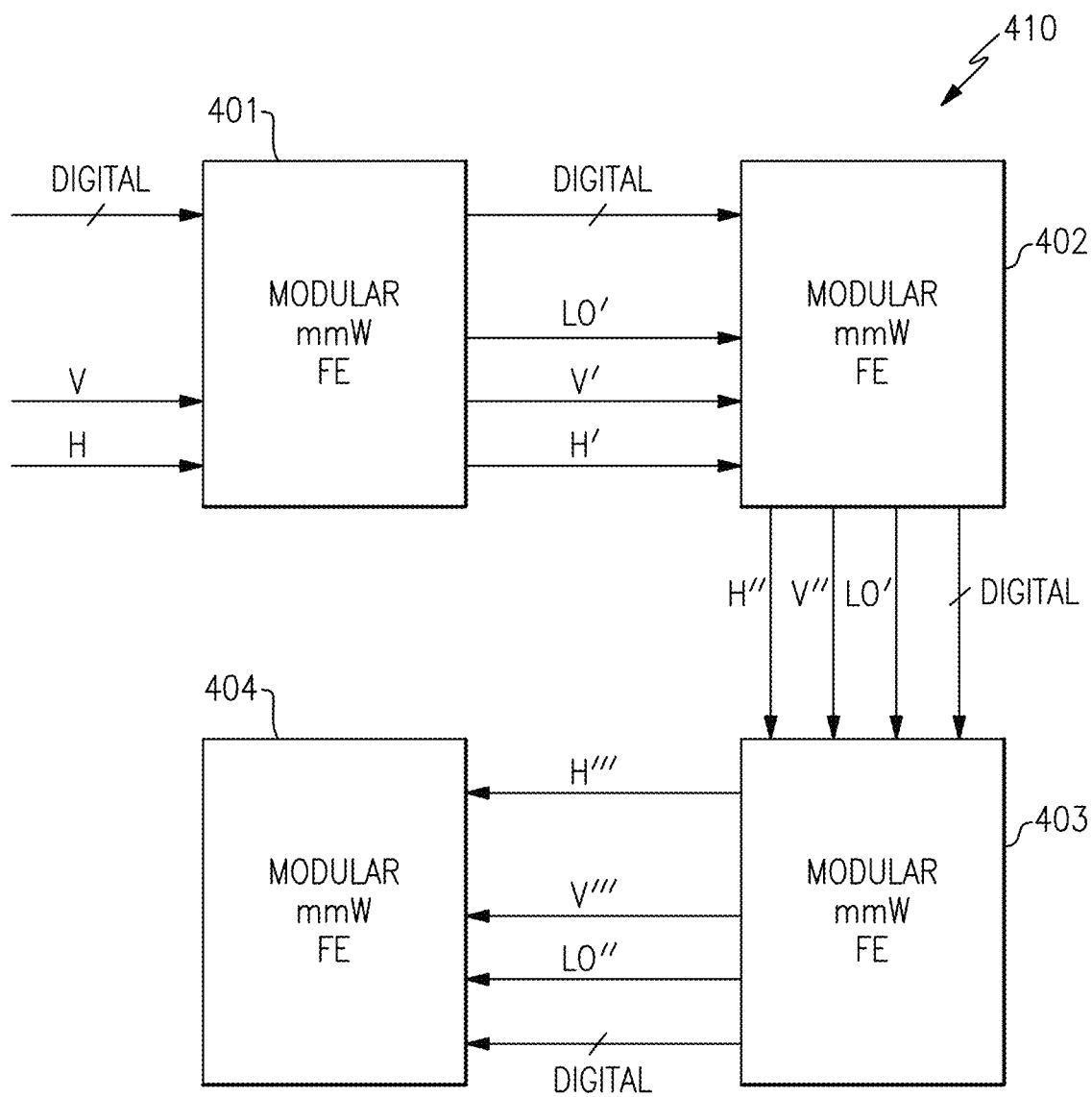
FIG. 10 is a schematic diagram of one embodiment of a millimeter wave front-end system implemented using modular front-ends.

FIG. 10 is a schematic diagram of one embodiment of a mmW front-end system 410 implemented using modular front-ends. In particular, the mmW front-end system 410 includes a first modular front-end 401, a second modular front-end 402, a third modular front-end 403, and a fourth modular front-end 404 arranged to form a larger front-end system. Although depicted as communicating over mmW frequencies, other frequency ranges are possible, including, but not limited to, signals in the upper centimeter wave frequencies.

As shown in FIG. 10, the first modular front-end 401 receives digital data along with horizontal and vertical signals (H and V) for transmission. The first modular front-end 401 also passes the horizontal and vertical signals (H' and V'), an LO signal (LO), and digital data to the second modular front-end 402. Additionally, the second modular front-end 402 passes the horizontal and vertical signals (H" and V"), an LO signal (LO'), and digital data to the third modular front-end 403. Furthermore, the third modular front-end 403 passes the horizontal and vertical signals (H''' and V'''), an LO signal (LO"), and digital data to the fourth modular front-end 404.

Thus, the LO is generated in the first modular front-end 401 and provided to the other modules (with amplitude and/or phase adjustment is some implementations). Thus, LO generation circuitry in the other modules can be disabled to conserve power.

The horizontal and vertical signals (H and V) can be implemented using a wide variety of signaling techniques, for instance, IF (e.g., 9 GHz or other desired IF), baseband analog, and/or other suitable signaling. Thus, the modular front-ends can utilize direct conversion, heterodyne, and/or other suitable architectures.

In the illustrated embodiment, the front-end modules are daisy chained, with each of the front-end modules operating with V and H signals that can be adjusted by signal conditioning (for instance, buffered and/or phased) for the signal delay through each module and board trace to match. Such signal conditioning can vary based on the specific arrangement of the front-end modules. For example, different amounts and/or forms of signal conditioning can be applied when using a star configuration relative to a daisy chain configuration of front-end modules. The signal conditioning (for instance, amplitude and/or delay adjustment) is controlled by digital programming, in certain implementations. Such signal conditioning settings can be different for each front-end module to allow for module-specific adjustments to enhance operation of the full system.

The front-end modules operate using digital data that is interpreted by one module and passed to other module(s) as needed. Such passing can include data modification that considers a number of adjacent modules, calibration parameters, and/or other factors. The LO signal is also shared in this example (with amplitude and/or phase adjustment is some implementations), which aids in providing good error vector magnitude (EVM).

Although a daisy chain configuration of front-end modules is shown, other implementations are possible, such as a star configuration.

Figure 11A:
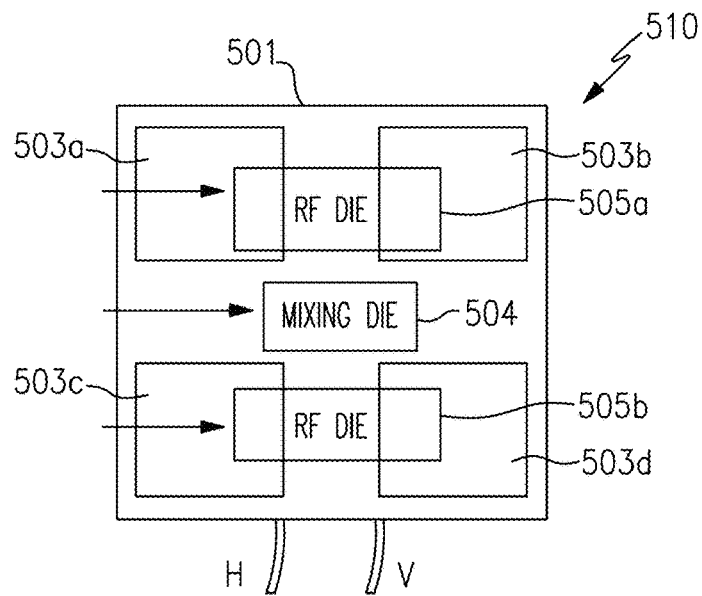
FIG. 11A is a plan view of a front-end module according to one embodiment.

FIG. 11A is a plan view of a front-end module 510 according to one embodiment. The front-end module 510 includes a substrate 501 on which a first patch antenna element 503a, a second patch antenna element 503b, a third patch antenna element 503c, and a fourth patch element 503d are formed. Additionally, an up/down conversion die 504 (including a up/down converter, frequency synthesizer, phase-locked loop, and/or mixers implemented in accordance with the teachings herein as well as any other desired functionality, such as power management, calibration, communications, etc.) is attached to the substrate 501. Furthermore, a first RF die 505a (including RF transmit and receive channels associated with antenna elements 503a and 503b) and a second RF die 505b (including RF transmit and receive channels associated with antenna elements 503c and 503d) are attached to the substrate 501. In certain implementations, the substrate 501 is a laminate, and one or more of the dies are included in cavity of the laminate or attached to an outer surface of the laminate.

The front-end module 510 communicates over a bidirectional horizontal signal line H and a bidirectional vertical signal line V, for instance, using a configuration similar to that shown in FIG. 9. The depicted dies can also receive and/or send data. Although a three die configuration is depicted, other numbers of dies are possible. Furthermore, although four antenna elements are depicted, other numbers of antenna elements are possible as well as other antenna element array patterns.

In the illustrated embodiment, the front-end module 510 is highly efficient and flexible for accommodating various phased antenna arrays. For example, mmW and/or FR2 phased array antennas of any desired size can be rapidly assembled with low complexity by choosing a number of instantiations of the front-end module 510 suitable for implementing the phased antenna array. In this example, the front-end module 510 includes a two-by-two (2×2) arrangement of patch antennas along with accompanying RF transmit channels, RF receive channels, mixing, and other support circuitry to serve as a core building block to assemble larger arrays. Such front-end modules can serve a wide range of applications, including, but not limited to, infrastructure, CPE, and/or satellite communications (SatCom).

The front-end module 510 can be implemented with inter-module control, calibration, and communications (any or all of which can be a digital interface).

Figure 11B:
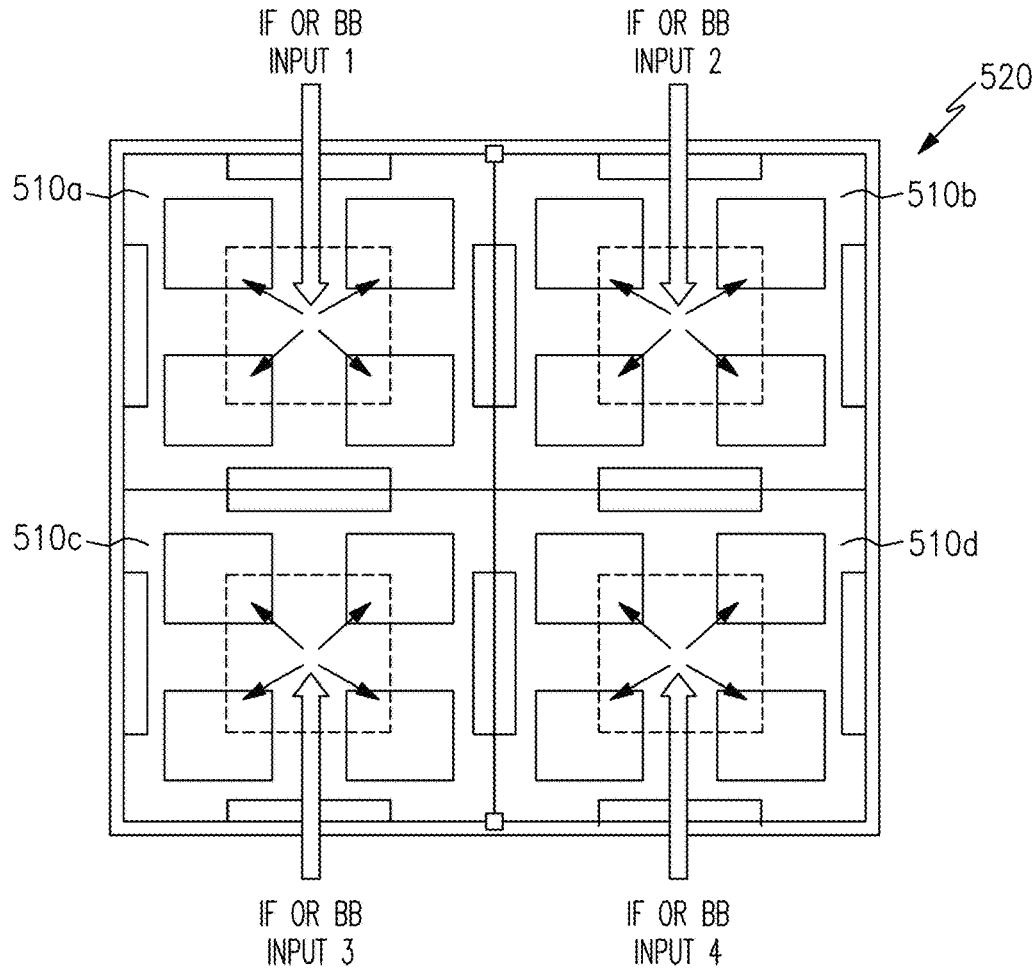
FIG. 11B is a plan view of a two-by-two array of front-end modules according to one embodiment.

FIG. 11B is a plan view of a 2×2 array 520 of front-end modules according to one embodiment. As shown in FIG. 11B, four of the front-end modules (modules 510a, 510b, 510c, 510d) of FIG. 11A have been joined to form a four by four (4×4) array of patch antenna elements.

Thus, the front-end module 510 of FIG. 11A can be flexibly deployed to form a larger front-end system of desired size.

Figure 12:
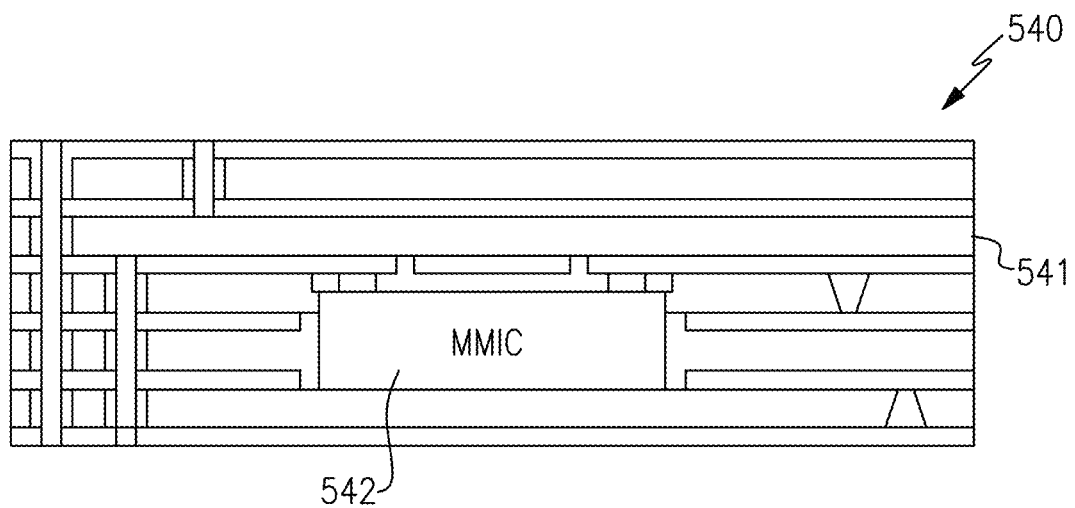
FIG. 12 is a cross-section of a front-end module according to one embodiment.

FIG. 12 is a cross-section of a front-end module 540 according to one embodiment. The front-end module 540 includes a printed circuit board (PCB) 541 with a monolithic microwave integrated circuit (MMIC) 542 embedded therein.

Figure 13:
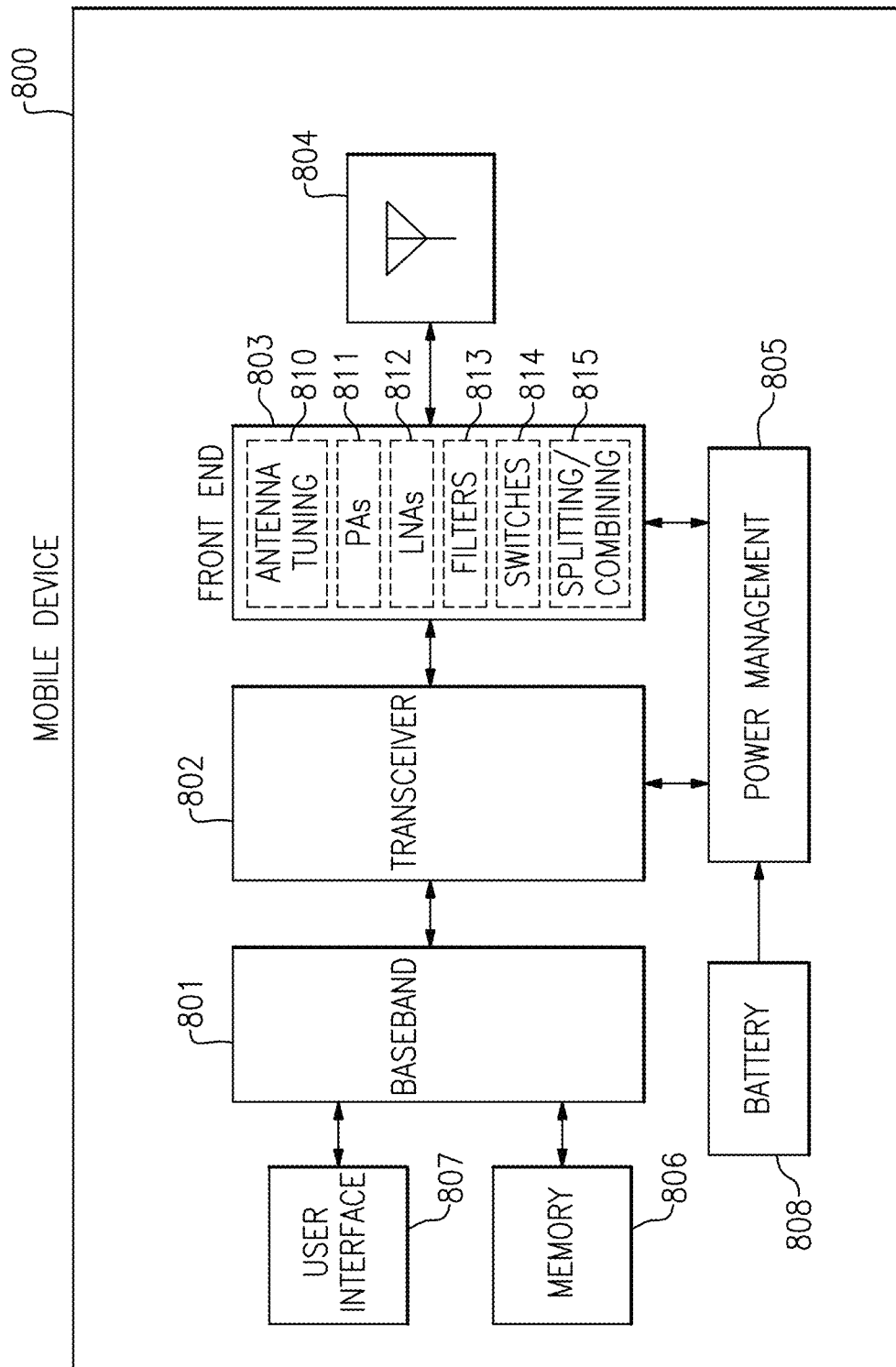
FIG. 13 is a schematic diagram of one embodiment of a mobile device.

FIG. 13 is a schematic diagram of one embodiment of a mobile device 800. The mobile device 800 includes a baseband system 801, a transceiver 802, a front-end system 803, antennas 804, a power management system 805, a memory 806, a user interface 807, and a battery 808.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 13 as the transceiver 802. In one example, separate components (for instance, separate circuits or dies) can be provided for handling certain types of RF signals.

The front-end system 803 aids in conditioning signals transmitted to and/or received from the antennas 804. In the illustrated embodiment, the front-end system 803 includes antenna tuning circuitry 810, power amplifiers (PAs) 811, low noise amplifiers (LNAs) 812, filters 813, switches 814, and signal splitting/combining circuitry 815. However, other implementations are possible.

For example, the front-end system 803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas for transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front-end system 803 can include amplifiers having controllable gain and phase shifters having controllable phase to provide beam formation and directivity for transmission and/or reception of signals using the antennas 804. For example, in the context of signal transmission, the amplitude and phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 13, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers 811. For example, the power management system 805 can be configured to change the supply voltage(s) provided to one or more of the power amplifiers 811 to improve efficiency, such as power added efficiency (PAE).

As shown in FIG. 13, the power management system 805 receives a battery voltage from the battery 808. The battery 808 can be any suitable battery for use in the mobile device 800, including, for example, a lithium-ion battery.

Applications

The principles and advantages of the embodiments described herein can be used for a wide variety of applications.

For example, dynamically managed antenna arrays can be included in various electronic devices, including, but not limited to consumer electronic products, parts of the consumer electronic products, electronic test equipment, etc. Example electronic devices include, but are not limited to, a base station, a wireless network access point, a mobile phone (for instance, a smartphone), a tablet, a television, a computer monitor, a computer, a hand-held computer, a personal digital assistant (PDA), a microwave, a refrigerator, an automobile, a stereo system, a disc player, a digital camera, a portable memory chip, a washer, a dryer, a copier, a facsimile machine, a scanner, a multi-functional peripheral device, a wrist watch, a clock, etc. Further, the electronic devices can include unfinished products.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A beamforming communication system comprising:
an antenna array partitioned into a plurality of sub-arrays;
a plurality of front-end channels each operatively associated with one of the sub-arrays;
a plurality of data conversion channels; and
a crossbar switch configured to receive a plurality of analog transmit signals from the plurality of data conversion channels and to provide a plurality of gain-controlled analog transmit signals to the plurality of front-end channels, the crossbar switch including a plurality of controllable gain elements each configured to separately control a gain of a respective one of the plurality of analog transmit signals.

2. The beamforming communication system of claim 1 wherein the crossbar switch is configured to connect one of the plurality of front-end channels to two or more of the plurality of data conversion channels.

3. The beamforming communication system of claim 1 wherein the crossbar switch is configured to connect two or more of the plurality of front-end channels to one of the plurality of data conversion channels.

4. The beamforming communication system of claim 1 wherein the number of the plurality of data conversion channels is greater than the plurality of front-end channels.

5. The beamforming communication system of claim 1 wherein the plurality of data conversion channels includes at least one redundant data conversion channel.

6. The beamforming communication system of claim 1 wherein each of the plurality of sub-arrays includes two or more antennas.

7. The beamforming communication system of claim 1 wherein each of the plurality of data conversion channels includes at least one digital-to-analog converter for generating an analog transmit signal, and at least one analog-to-digital converter for processing an analog receive signal.

8. The beamforming communication system of claim 1 wherein each of the plurality of data conversion channels includes at least one upconverting mixer for upconverting an analog transmit signal and at least one downconverting mixer for downconverting a radio frequency receive signal.

9. The beamforming communication system of claim 1 further comprising a plurality of mixers positioned between the crossbar switch and the plurality of front-end channels.

10. The beamforming communication system of claim 1 wherein each of the plurality of front-end channels includes a radio frequency splitter coupled to a plurality of radio frequency signal conditioning circuits.

11. The beamforming communication system of claim 1 wherein each of the plurality of front-end channels includes a radio frequency combiner coupled to a plurality of radio frequency signal conditioning circuits.

12. The beamforming communication system of claim 1 wherein each of the plurality of front-end channels includes a radio frequency splitter/combiner coupled to a plurality of radio frequency signal conditioning circuits.

13. The beamforming communication system of claim 1 wherein the crossbar switch is configured to connect two or more of the plurality of data conversion channels to a common front-end channel of the plurality of front-end channels.

14. The beamforming communication system of claim 13 wherein the two or more of the plurality of data conversion channels includes a first data conversion channel configured to process a first data stream associated with a first signal polarization, and a second data conversion channel configured to process a second data stream associated with a second signal polarization.

15. The beamforming communication system of claim 13 wherein the two or more of the plurality of data conversion channels includes a first data conversion channel configured to process a first data stream associated with a first carrier frequency, and a second data conversion channel configured to process a second data stream associated with a second carrier frequency.

16. The beamforming communication system of claim 1 wherein at least one of a fan out of the crossbar switch or a fan in of the crossbar switch is not equal to one.

17. A mobile device comprising:
an antenna array partitioned into a plurality of sub-arrays;

a front-end system comprising a plurality of front-end channels each operatively associated with one of the sub-arrays; and a transceiver comprising a plurality of data conversion channels and a crossbar switch configured to receive a plurality of analog transmit signals from the plurality of data conversion channels and to provide a plurality of gain-controlled analog transmit signals to the plurality of front-end channels, the crossbar switch including a plurality of controllable gain elements each configured to separately control a gain of a respective one of the plurality of analog transmit signal.

18. A method of beamforming, the method comprising:

providing a plurality of gain-controlled analog transmit signals from a crossbar switch to a plurality of front-end channels that are coupled to an antenna array, the antenna array partitioned into a plurality of sub-arrays each operative associated with one of the plurality of front-end channels;

providing a plurality of analog transmit signals from a plurality of data conversion channels to the crossbar switch;

separately controlling a gain of each of the plurality of analog transmit signals using a corresponding controllable gain element of a plurality of controllable gain elements of the crossbar switch; and beamforming a radio wave using the plurality of data conversion channels and the plurality of front-end channels.

19. The method of claim 18 further comprising using the crossbar switch to connect two or more of the plurality of data conversion channels to a common front-end channel of the plurality of front-end channels.

20. The method of claim 19 further comprising using the two or more of the plurality of data conversion channels to process a first data stream associated with a first carrier frequency and a second data stream associated with a second carrier frequency.

\* \* \* \* \*